(12) United States Patent
Kawamoto et al.

(10) Patent No.: US 8,700,186 B2
(45) Date of Patent: Apr. 15, 2014

(54) PLANT CONTROL SYSTEM AND PROGRAM RELOCATE METHOD

(75) Inventors: Junichi Kawamoto, Fuchu (JP); Harumi Hozoji, Fuchu (JP); Akira Nojima, Kunitachi (JP)

(73) Assignees: Kabushiki Kaisha Toshiba, Tokyo (JP); Toshiba Mitsubishi-Electric Industrial Systems Corporation, Tokyo (JP)

( * ) Notice: Subject to any disclaimer, the term of this patent is extended or adjusted under 35 U.S.C. 154(b) by 128 days.

(21) Appl. No.: 13/087,690

(22) Filed: Apr. 15, 2011

(65) Prior Publication Data

US 2011/0270421 A1 Nov. 3, 2011

(30) Foreign Application Priority Data

Apr. 30, 2010 (JP) ................................. 2010-105621

(51) Int. Cl.
*G05B 11/01* (2006.01)
(52) U.S. Cl.
USPC .......................................................... 700/20
(58) Field of Classification Search
USPC ..................................................... 700/17, 20
See application file for complete search history.

(56) References Cited

U.S. PATENT DOCUMENTS

| | | | | |
|---|---|---|---|---|
| 7,117,186 | B2 * | 10/2006 | Koza et al. ........................ | 706/13 |
| 7,600,234 | B2 * | 10/2009 | Dobrowski et al. ............ | 719/330 |
| 7,725,303 | B2 * | 5/2010 | Tramontana ..................... | 703/13 |
| 8,290,954 | B2 * | 10/2012 | Baker et al. ..................... | 707/736 |
| 2003/0153988 | A1 * | 8/2003 | Shepard et al. ................. | 700/19 |
| 2004/0181300 | A1 * | 9/2004 | Clark et al. ..................... | 700/73 |
| 2004/0254910 | A1 * | 12/2004 | Tiegelkamp ..................... | 707/1 |
| 2008/0148296 | A1 * | 6/2008 | Chen et al. .................... | 719/328 |

FOREIGN PATENT DOCUMENTS

| | | |
|---|---|---|
| CN | 1280333 A | 1/2001 |
| CN | 101154104 A | 4/2008 |
| CN | 100422887 C | 10/2008 |
| JP | 11-85490 | 3/1999 |
| JP | 2001-22401 | 1/2001 |

OTHER PUBLICATIONS

Korean Office Action issued Sep. 26, 2012, in Patent Application No. 10-2011-0040151 (with English-language translation).
Combined Chinese Office Action and Search Report issued on Feb. 18, 2013, in Chinese Patent Application No. 201110118126.5 with English translation.

\* cited by examiner

*Primary Examiner* — Kavita Padmanabhan
*Assistant Examiner* — Patrick Cummins
(74) *Attorney, Agent, or Firm* — Oblon, Spivak, McClelland, Maier & Neustadt, L.L.P.

(57) ABSTRACT

According to one embodiment, a plant control system includes a station mounting controllers thereon, an engineering device which manages programs, and a device which connects the controllers and the engineering device. The engineering device includes database which stores information on a first variable for allowing data to be shared among programs in each controller and a second variable for allowing data to be shared among programs in the station, the database management part, and a relocate management part which moves the program, and the relocate management part includes a designating module which designates an execution order of programs in a source controller, one or more programs to be moved, a destination controller, and the source controller, a module which moves the program as designated in the designating module, and a changing module which, when the program is moved, moves or copies the first and second variable used in the program.

17 Claims, 24 Drawing Sheets

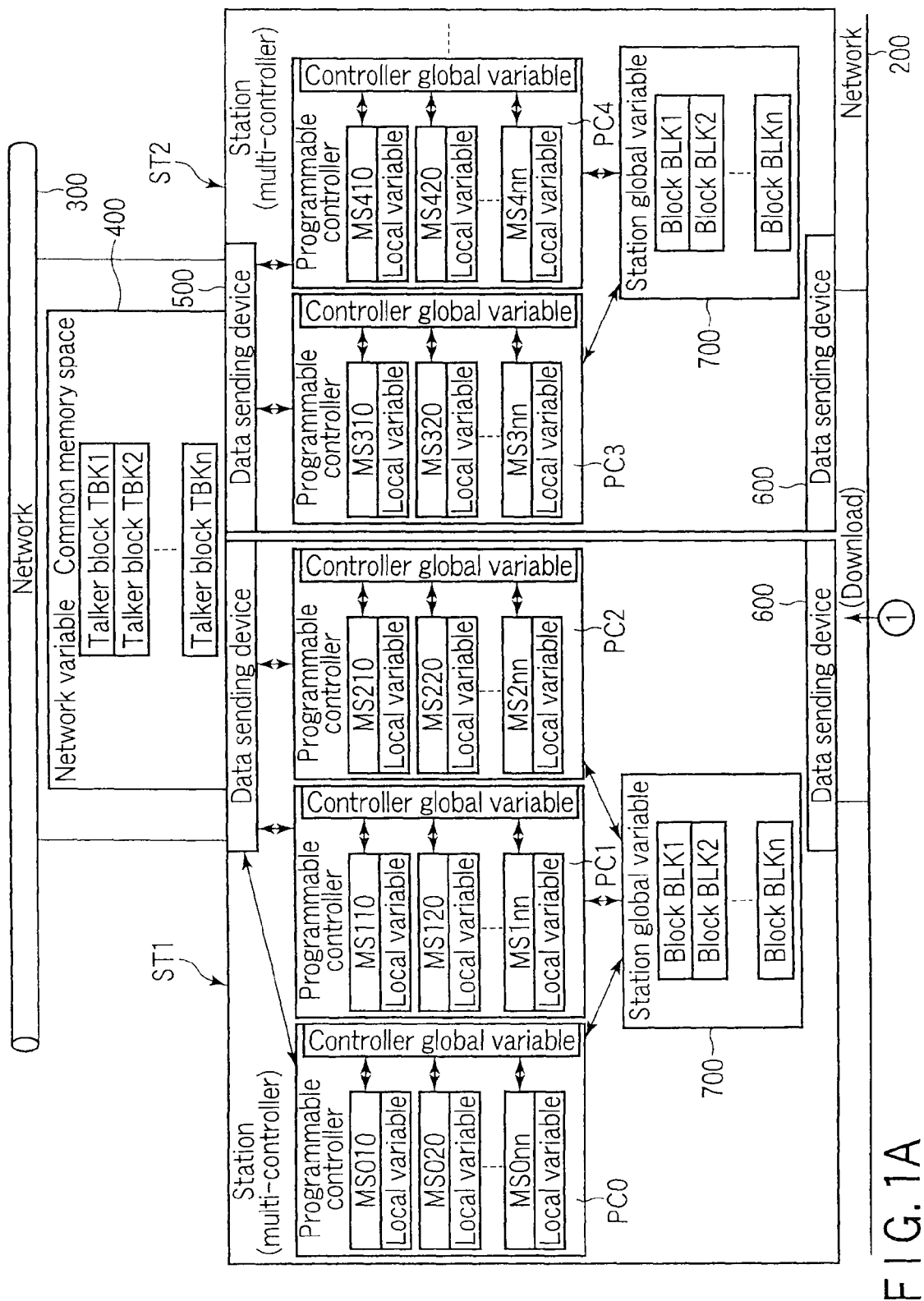
F I G. 1A

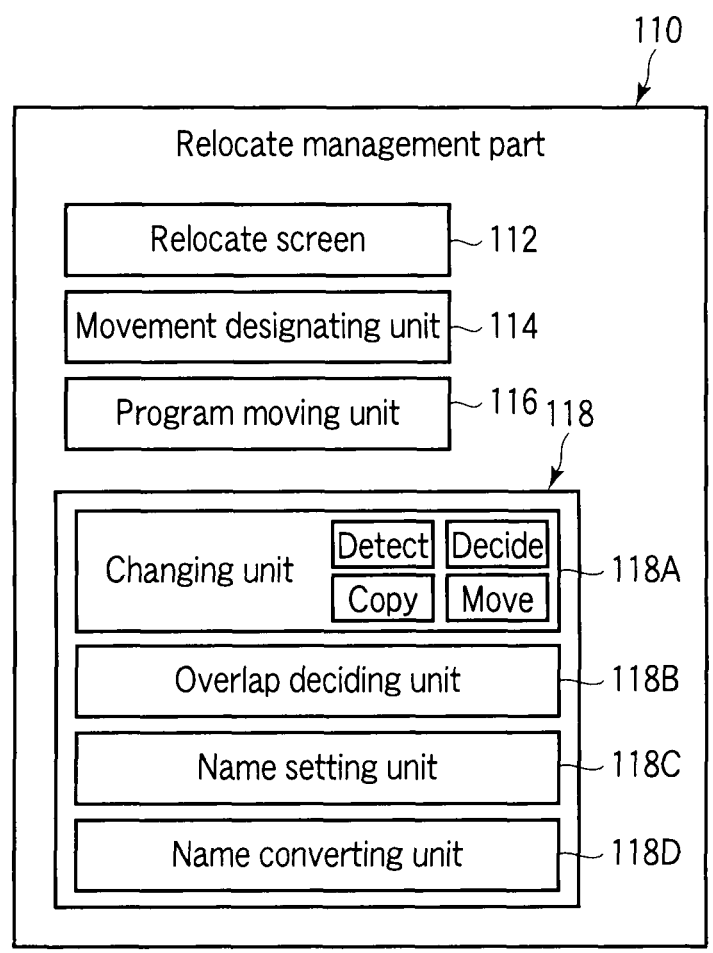
F I G. 2A

FIG. 3

| Movement of program | | | |
|---|---|---|---|
| Movement source | | | |
| Station: | nvStn1 | | ▶ |
| Controller: | 00:PU866 | | ▶ |
| Task name: | MS | | |
| Select all | Cancel all | | |

| Task entry number | Program name | Comment |
|---|---|---|
| 001 | TEST_MS001 | Cooling valve & heat ins |
| 002 | TEST_MS002 | Comment0002 |
| 003 | TEST_MS003 | Comment0003 |
| 004 | TEST_MS004 | Comment0004 |
| 005 | TEST_MS005 | Comment0005 |
| 006 | TEST_MS006 | Comment0006 |
| 007 | TEST_MS007 | Comment0007 |
| 008 | TEST_MS008 | Comment0008 |
| 009 | TEST_MS009 | Comment0009 |
| 010 | TEST_MS010 | Comment0010 |
| 011 | | |
| 012 | | |
| 013 | | |
| 014 | | |
| 015 | TEST_MS015 | Comment0015 |
| 016 | TEST_MS016 | Comment0016 |
| 017 | | |
| 018 | | |
| 019 | | |
| 020 | TEST_MS020 | Comment0020 |
| 021 | TEST_MS021 | Comment0021 |

| Movement destination | | | |
|---|---|---|---|
| Station: | nvStn1 | | ▶ |
| Controller: | 02:PU866 | | ▶ |
| Task name: | MS | | |
| Clear | Clear all | Start moving | |

| Task entry number | Program name | Comment |
|---|---|---|
| 001 | RM_MS001 | Comment01 |
| 002 | RM_MS002 | Comment02 |
| 003 | RM_MS003 | Comment03 |
| 004 | RM_MS004 | Comment04 |
| 005 | | |
| *006 | TEST_MS001 | Cooling valve & heat ins |
| *007 | TEST_MS002 | Comment0002 |
| *008 | TEST_MS003 | Comment0003 |
| 009 | | |
| 010 | RM_MS010 | Comment10 |
| 011 | RM_MS011 | Comment11 |
| 012 | | |
| 013 | | |
| 014 | | |
| 015 | | |
| 016 | | |
| 017 | | |
| 018 | RM_MS018 | Comment18 |
| 019 | RM_MS019 | Comment19 |
| 020 | | |
| 021 | | |

OK   Cancel

112A

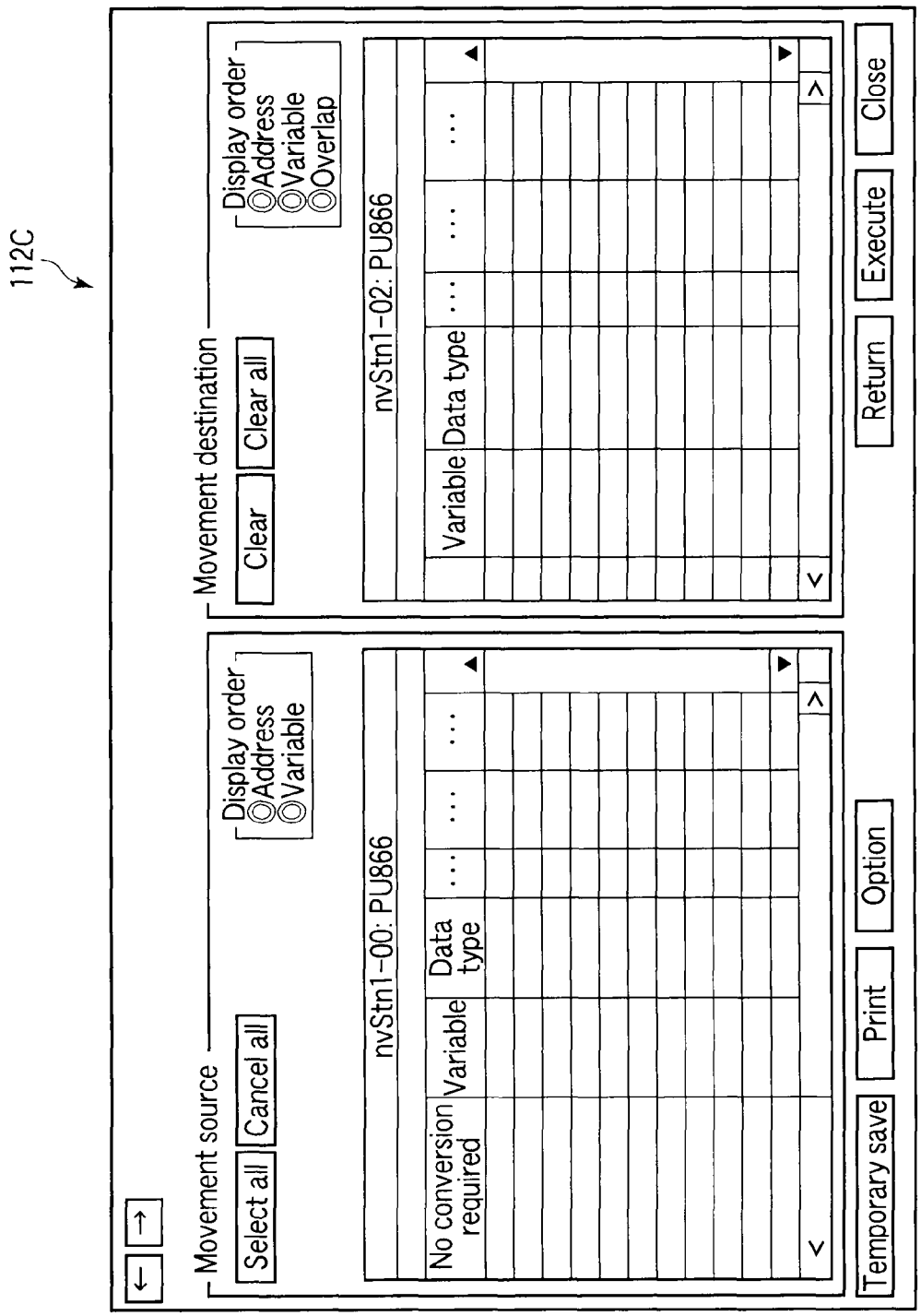
F I G. 5

Designate prefix conversion

Before conversion    After conversion    ←—112D

| G | → | L |
| G ?A | → | L ?A |
| G #A | → | L #A |
| G *A | → | L *A |
|  | → |  |

[ Set ]  [ Close ]

·Examples of conversion rule

| Character pattern | Matching character |
|---|---|
| Arbitrary character | Arbitrary character |
| ? (One-byte) | Arbitrary alphabet |
| # (One-byte) | Arbitrary number (one-byte) |
| * (One-byte) | Arbitrary number of characters |

·Examples of conversion

|  | Arbitrary character |  |  |  |
|---|---|---|---|---|
| Before conversion | "G_" | "G_?A" | "G_#A" | "G_*A" |
| After conversion | "L_" | "L_?A" | "L_#A" | "L_*A" |
| Character to be retrieved | "G_OFF" | "G_AA" | "G_1A" | "G_XYZA" |
| After conversion | "L_OFF" | "L_AA" | "L_1A" | "L_XYZA" |
| Character not to be retrieved | "GG_ON" | "G_AB" | "G_1B" | "G_XYZ" |

FIG. 6

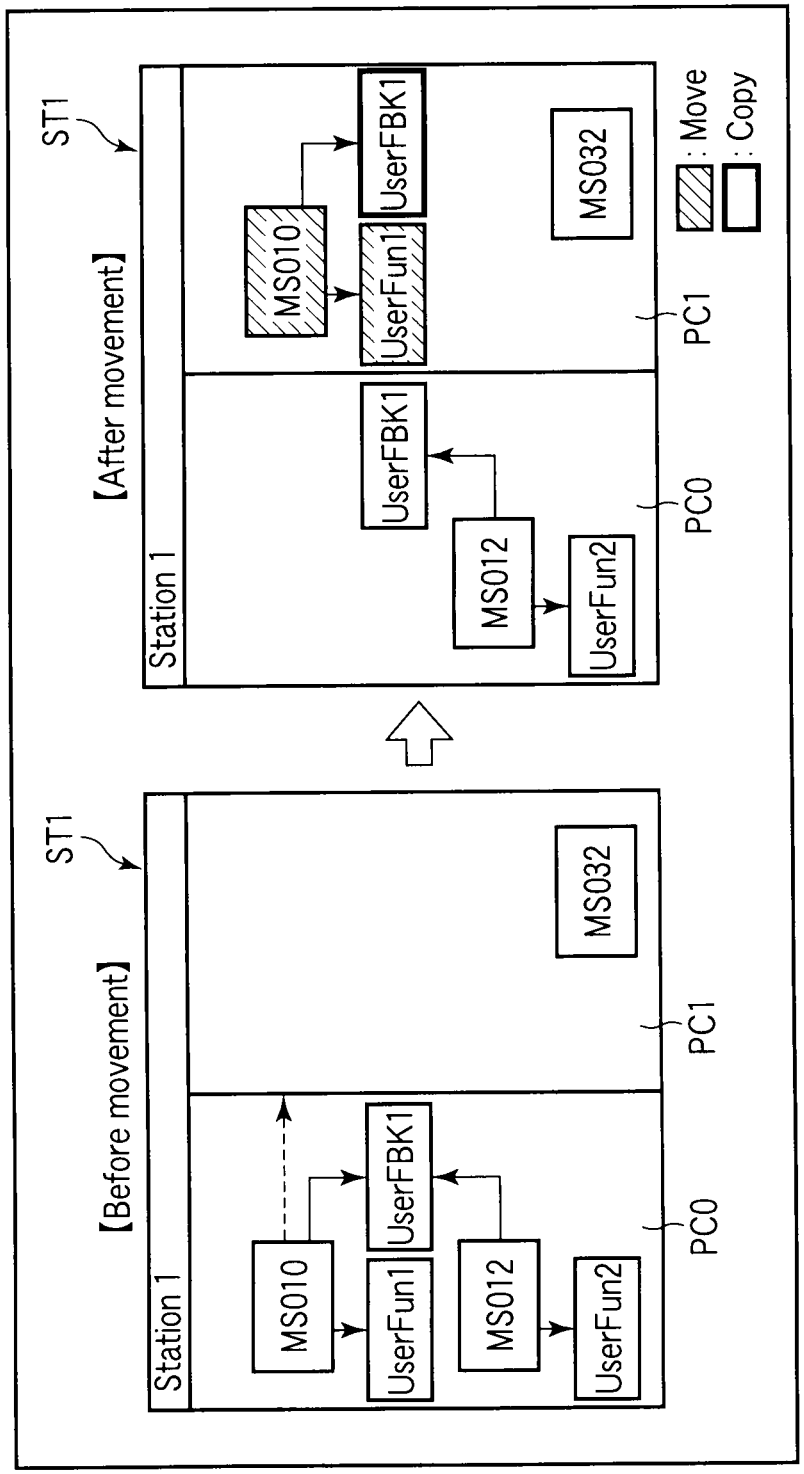
F I G. 8

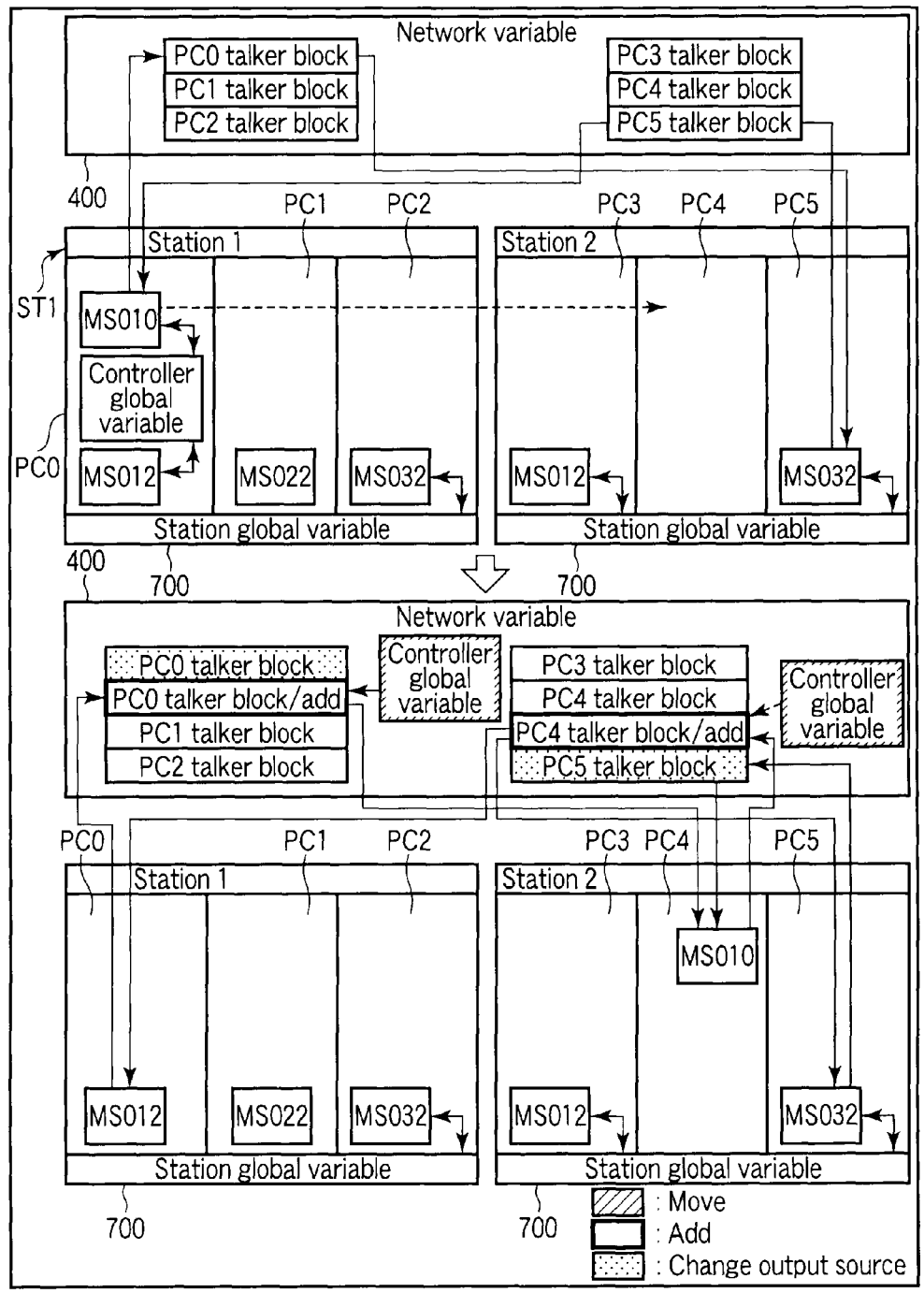
F I G. 14

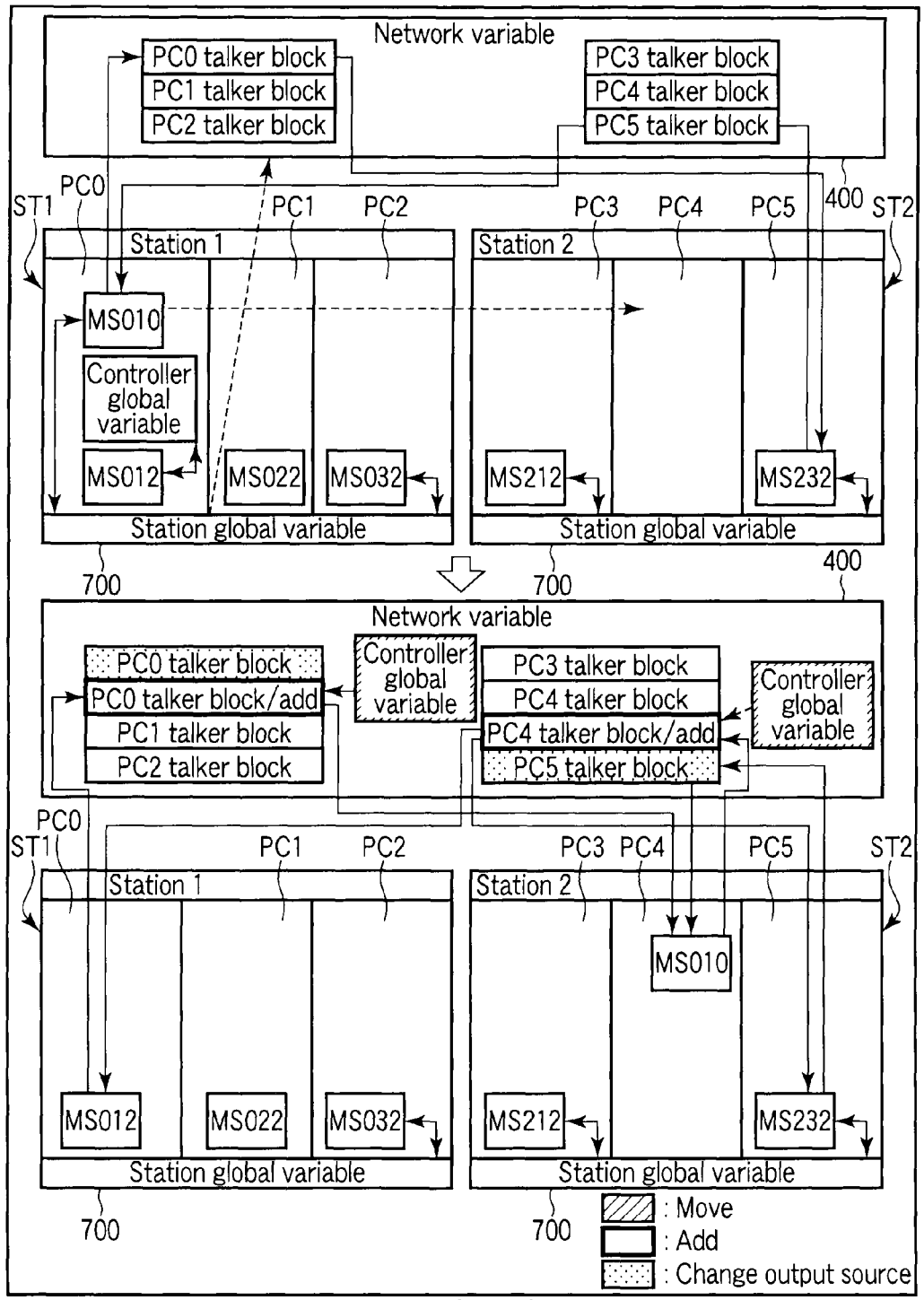
F I G. 16

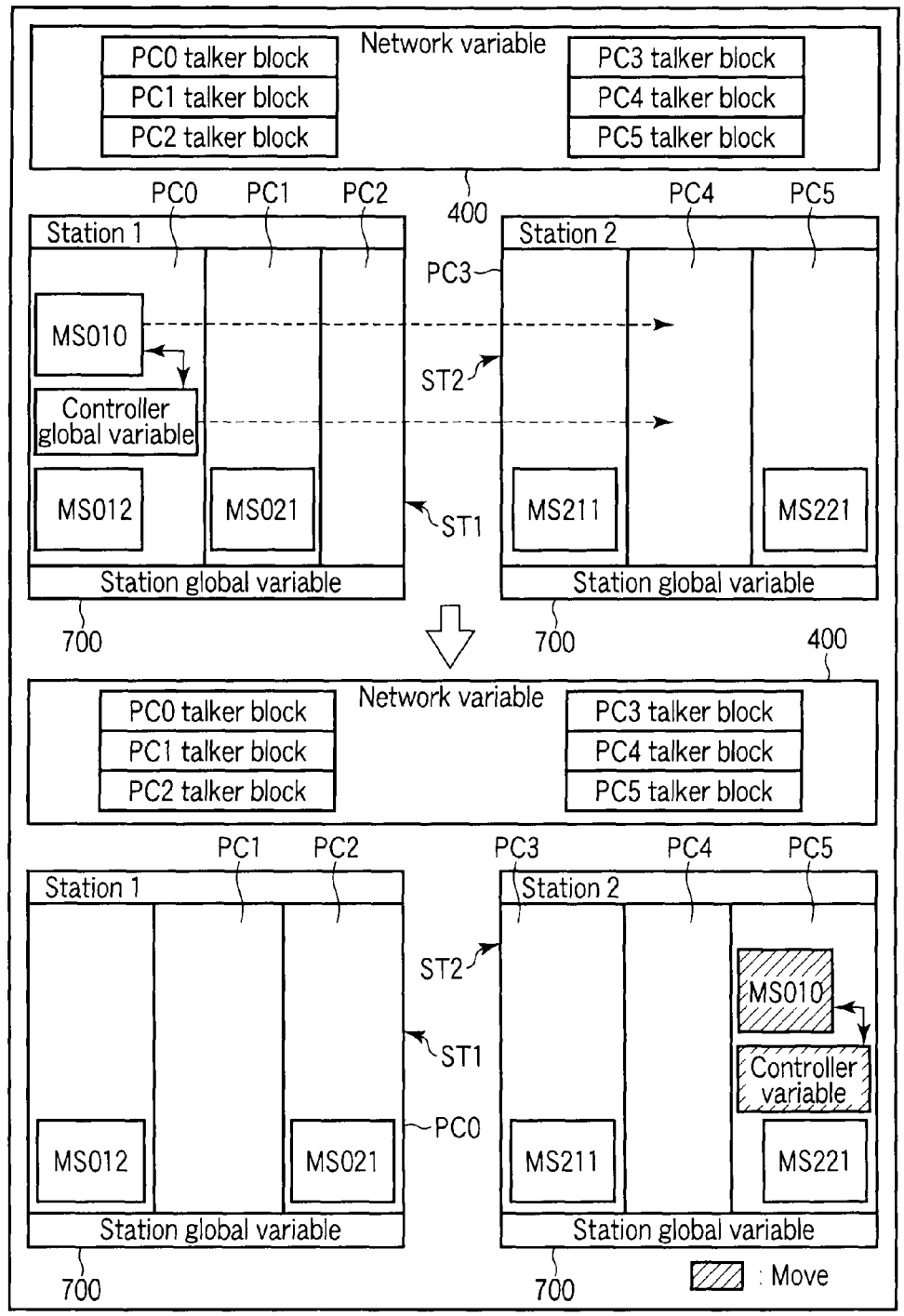
F I G. 17

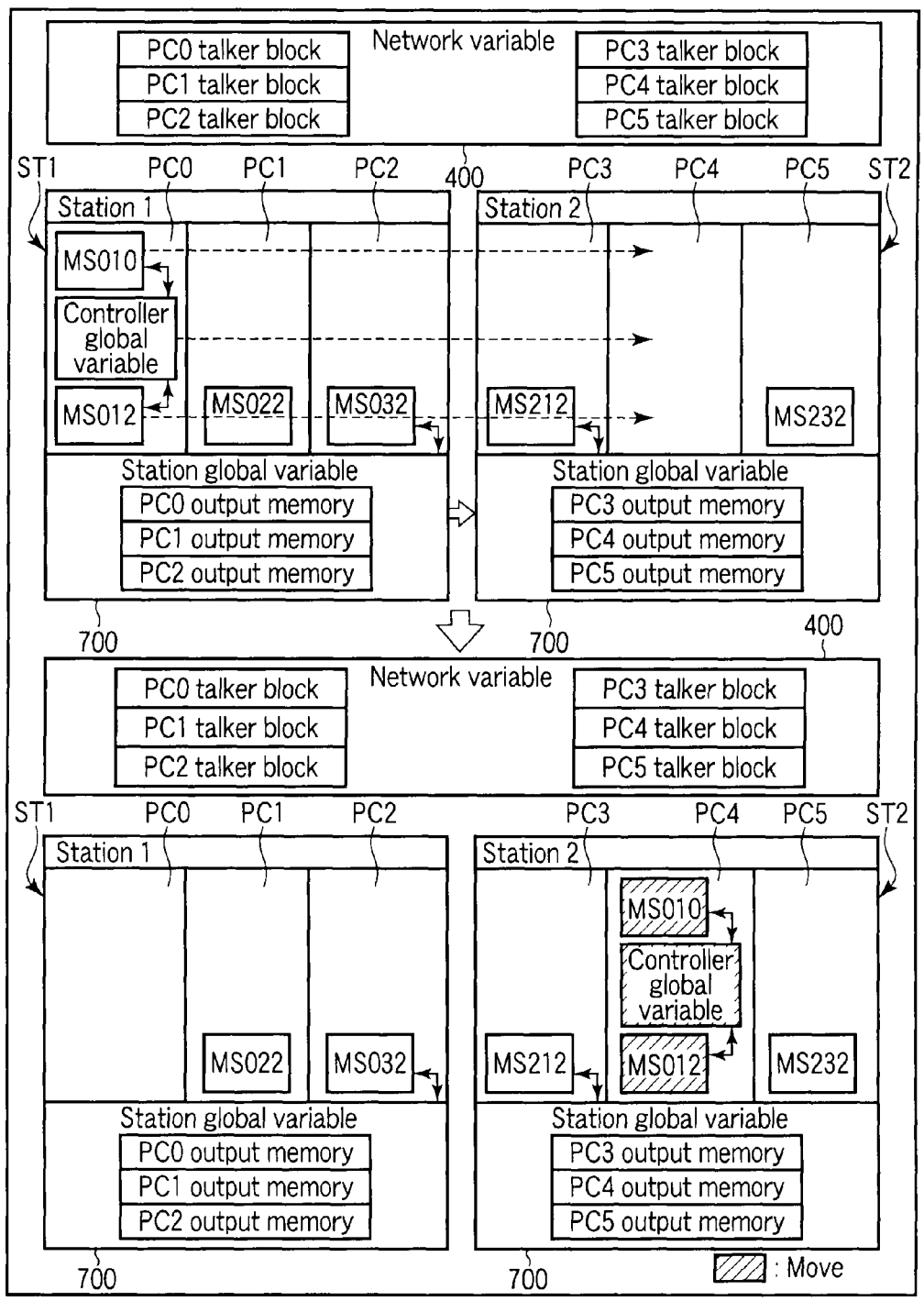
F I G. 18

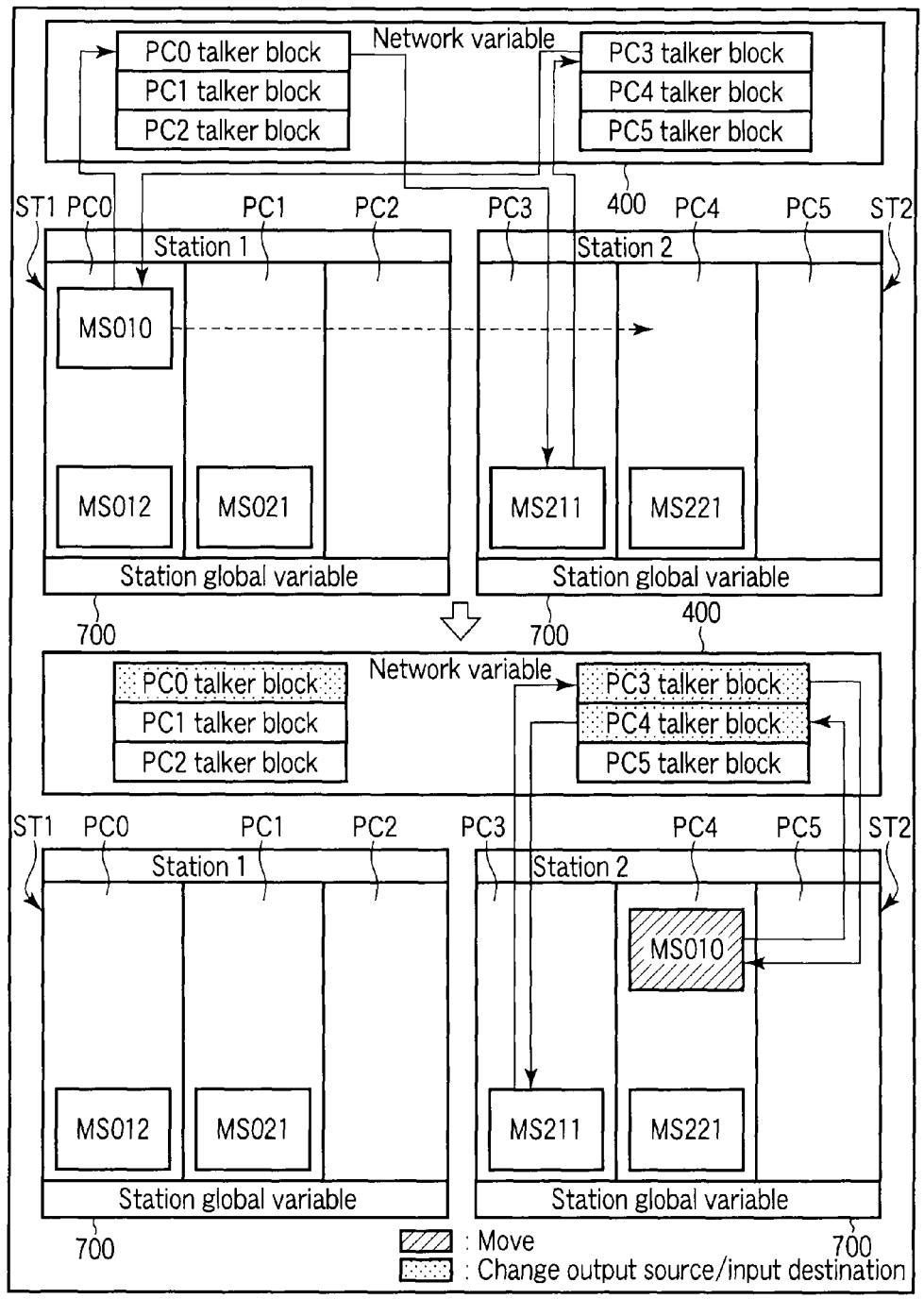
F I G. 21

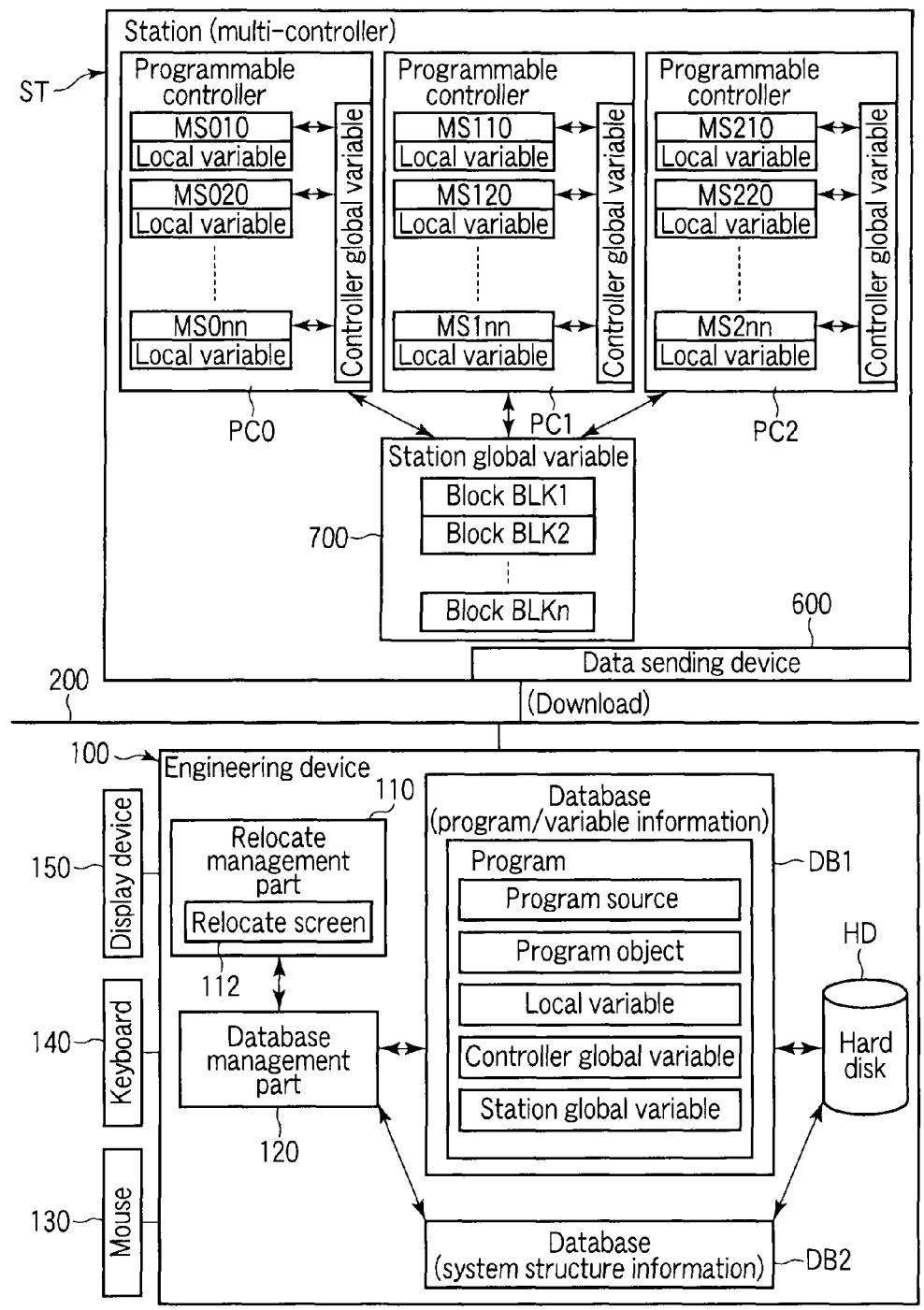
F I G. 22

PLANT CONTROL SYSTEM AND PROGRAM RELOCATE METHOD

CROSS-REFERENCE TO RELATED APPLICATIONS

This application is based upon and claims the benefit of priority from Japanese Patent Application No. 2010-105621, filed Apr. 30, 2010; the entire contents of which are incorporated herein by reference.

FIELD

Embodiments described herein relate generally to a plant control system and a program relocate method.

BACKGROUND

A plant control system comprises one or a plurality of programmable controllers, and a data sending device configured to transmit and receive data among the plurality of programmable controllers. A plurality of programs are executed inside the programmable controllers. Each program sets therein four types of variables described later, for example.

In other words, there are set a local variable which is effective only inside one program, a controller global variable which enables data to be shared among the plurality of programs inside a programmable controller, a station global variable which enables data to be shared among the plurality of programs of the plurality of programmable controllers inside a station of the data sending device, and a network variable which enables data to be shared among the plurality of programs of the plurality of programmable controllers in a plurality of stations of the data sending device.

BRIEF DESCRIPTION OF THE DRAWINGS

FIG. 1A is a diagram schematically showing a structure example of a plant control system according to an embodiment;

FIG. 2A is a diagram schematically showing a structure example of a relocate management part of the plant control system shown in FIG. 1;

FIG. 3 is a diagram showing an example of a relocate screen when a program is moved in the plant control system shown in FIG. 1;

FIG. 5 is a diagram showing an example of the relocate screen when a variable is moved or copied in the plant control system shown in FIG. 1;

FIG. 6 is a diagram showing an example of a prefix conversion designating screen for setting a variable name conversion rule in the plant control system shown in FIG. 1;

FIG. 8 is a diagram for explaining exemplary operations of the plant control system according to the second embodiment;

FIG. 14 is a diagram for explaining exemplary operations of a plant control system according to a seventh embodiment;

FIG. 16 is a diagram for explaining exemplary operations of a plant control system according to a ninth embodiment;

FIG. 17 is a diagram for explaining exemplary operations of a plant control system according to a tenth embodiment;

FIG. 18 is a diagram for explaining exemplary operations of the plant control system according to the tenth embodiment;

FIG. 21 is a diagram for explaining exemplary operations of the plant control system according to the twelfth embodiment; and FIG. 22 is a diagram for explaining exemplary operations of a plant control system according to a thirteenth embodiment.

DETAILED DESCRIPTION

In general, according to one embodiment, a plant control system includes a station on which a plurality of programmable controllers are mounted, an engineering device configured to manage programs executed by the plurality of programmable controllers, an input device configured to be operated by a user and to supply an operation signal to the engineering device, a display device configured to display a video signal output from the engineering device, and a data sending device configured to connect the plurality of programmable controllers and the engineering device. The engineering device includes database configured to store variable information on a controller global variable for allowing data to be shared among a plurality of programs in each programmable controller and a station global variable for allowing data to be shared among a plurality of programs in the station, the database management part and a relocate management part configured to move the programs, and the relocate management part includes a movement designating module configured to designate a source programmable controller, one or a plurality of programs to be moved, a destination programmable controller, and an execution order of programs in the source programmable controller, based on the operation signal from the input device; a module configured to move the program as designated by the movement designating module; and a variable changing module configured to move or copy the controller global variable and the station global variable used in the program to be accessible from the program when the program is moved.

A plant control system and a program relocate method according to a first embodiment will be described below in detail with reference to the drawings.

Figure 1B:
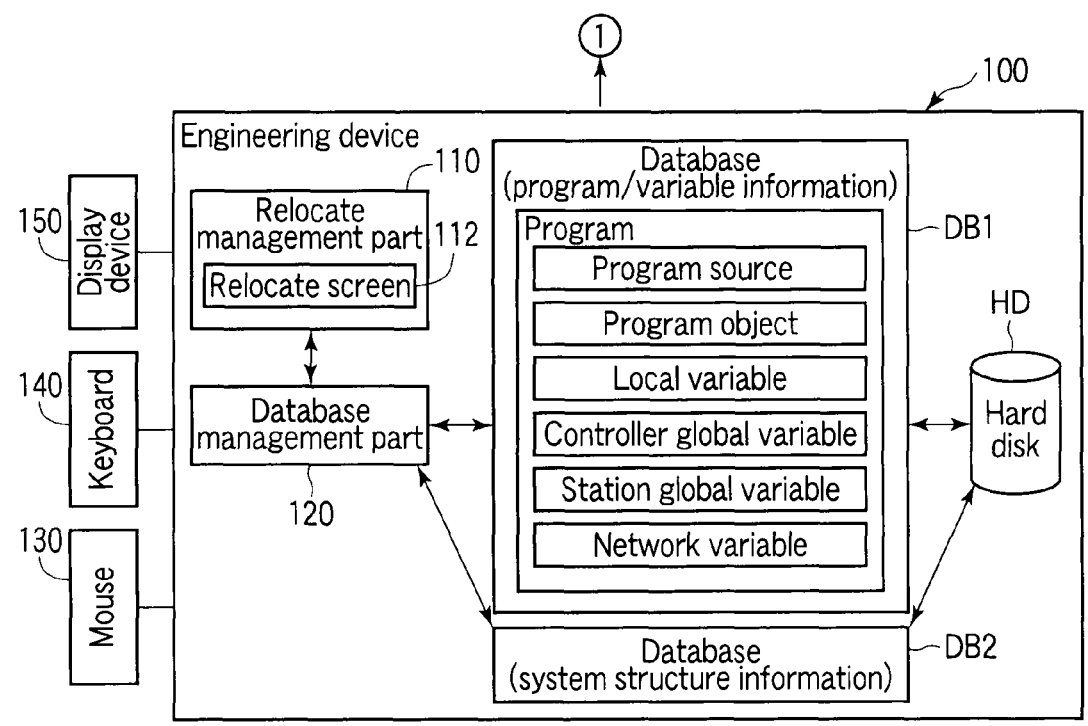
FIG. 1B is a diagram schematically showing a structure example of a plant control system according to an embodiment.

FIGS. 1A, 1B shows an example of the entire structure of the plant control system. The plant control system comprises a data sending device 500 having a common memory space 400; a multi-controller in which a plurality of programmable controllers are mountable on a station ST (ST1, ST2, . . . ) in the data sending device 500; programmable controllers PC (PC1, PC2, PC3, . . . ) having a local variable, a controller global variable, a station global variable and a network variable which can execute a plurality of programs and which can be used in the programs; and an engineering device 100 configured to manage memory addresses of the local variable collectively, the controller global variable, the station global variable and the network variable of all the programmable controllers PC, a memory address of the common memory space of the data sending device, a sending module and programs of all the programmable controllers PC.

The data sending device 500 is connected to a plant to be controlled via a network 300.

The engineering device 100 comprises a relocate management part 110, first database DB1 storing program information and various items of variable information therein, second database DB2 storing a system structure therein, a database management part 120 configured to manage the first database DB1 and the second database DB2, and a hard disk HD.

The first database DB1 stores therein program information, and various items of variable information such as addresses of a program source, a program object, a local variable, a controller global variable, a station global variable and a network variable. The second database DB2 stores therein system structure information on the plant control system. The system structure information is, for example, structure information on the programmable controllers constituting the station in the plant control system, and the program structure information executed in each programmable controller.

The relocate management part 110 is configured to display a relocate screen 112 and to perform a program relocate processing described later. The relocate management part 110 acquires the program information and the various items of variable information stored in the first database DB1 from the database management part 120. The relocate management part 110 acquires the system structure information stored in the second database DB2 from the database management part 120. When performing a program relocate processing, the relocate management part 110 supplies change information on the program or variable to the database management part 120. The database management part 120 updates the information stored in the first database DB1 and the second database DB2 according to the change information supplied from the relocate management part 110.

The engineering device 100 is connected with a mouse 130, a keyboard 140 and a display device 150. The mouse 130 and the keyboard 140 are input devices which are operated by a user to output an operation signal to the engineering device 100. The display device 150 is an output device which comprises a display part (not shown) and displays an image on the display part based on a signal supplied from the engineering device 100.

The engineering device 100 is configured to download the program information and the variable information via a data sending device 600 onto the programmable controllers PC (PC0, PC1, . . . ).

A station ST1 comprises the programmable controllers PC0, PC1, PC2, the data sending device 500 comprising the common memory space, a station global variable part 700 and the data sending device 600.

For example, the programmable controller PC0 records therein programs MS010, MS020, . . . MS0*nn*, the local variables set for the respective programs MS010, MS020, . . . MS0*nn*, and the controller global variable.

The programmable controller PC1 records therein programs MS110, MS120, . . . MS1*nn*, the local variables set for the respective programs MS110, MS120, . . . MS1*nn*, and the controller global variable.

The programmable controller PC2 records therein programs MS210, MS220, . . . MS2*nn*, the local variables set for the respective programs MS210, MS220, . . . MS2*nn*, and the controller global variable.

A station ST2 comprises programmable controllers PC3, PC4, the data sending device 500 comprising the common memory space, the station global variable part 700 and the data sending device 600.

The programmable controller PC3 records therein programs MS310, MS320, . . . MS3*nn*, the local variables set for the respective programs MS310, MS320, . . . MS3*nn*, and the controller global variable.

The programmable controller PC4 records therein programs MS410, MS420, . . . MS4*nn*, the local variables set for the respective programs MS410, MS420, . . . MS4*nn*, and the controller global variable.

The station global variable part 700 comprises a plurality of blocks BLK1, BLK2, . . . BLKn configured to store the station global variable for exchanging data among the programs contained in the different programmable controllers PC inside the same station ST.

The data sending device 500 comprises the common memory space recording the network variable therein. The common memory space comprises a plurality of talker blocks TBK1, TBK2, . . . TBKn recording the network variables therein. The talker blocks TBK1, TBK2, . . . TBKn are allocated as a transmission data area to a plurality of programmable controllers PC0, PC1, PC2, PC3 and PC4, respectively.

FIG. 2A schematically shows a structure example of the relocate management part 110.

The relocate management part 110 comprises a movement designating module 114 configured to designate an execution order of programs in a source programmable controller PC, one or a plurality of programs to be moved, a destination programmable controller PC, and the source programmable controller, based on an operation signal from the input device, a program moving module 116 configured to move the program as designated by the movement designating module 114, and a variable changing module 118 configured to, when the program is moved, move or copy the variable used in the program to be accessible from the program.

The variable changing module 118 comprises a changing module 118A configured to move or copy a variable, an overlap deciding module 118B configured to decide whether a variable name overlaps with another, a name setting module 118C configured to set a variable name, and a name converting module 118D configured to change the variable name to the set name.

The changing module 118A comprises a detecting module configured to detect a variable used in a program to be moved, a deciding module configured to decide whether the variable is being used in another program, a copying module configured to copy a variable, and a moving module configured to move a variable.

In the plant control system as described above, for example, when the program MS010 and the program MS020 in the programmable controller PC0 exchange data via the controller global variable, if only the program MS010 is moved to the programmable controller PC1 inside the station ST1, the data cannot be exchanged between the program MS010 and the program MS020 via the controller global variable.

The plant control system according to the present embodiment is configured so that, when a program is moved, a variable name is changed not only for the movement of the program but also for the exchange of the data via the variable.

Figure 2B:
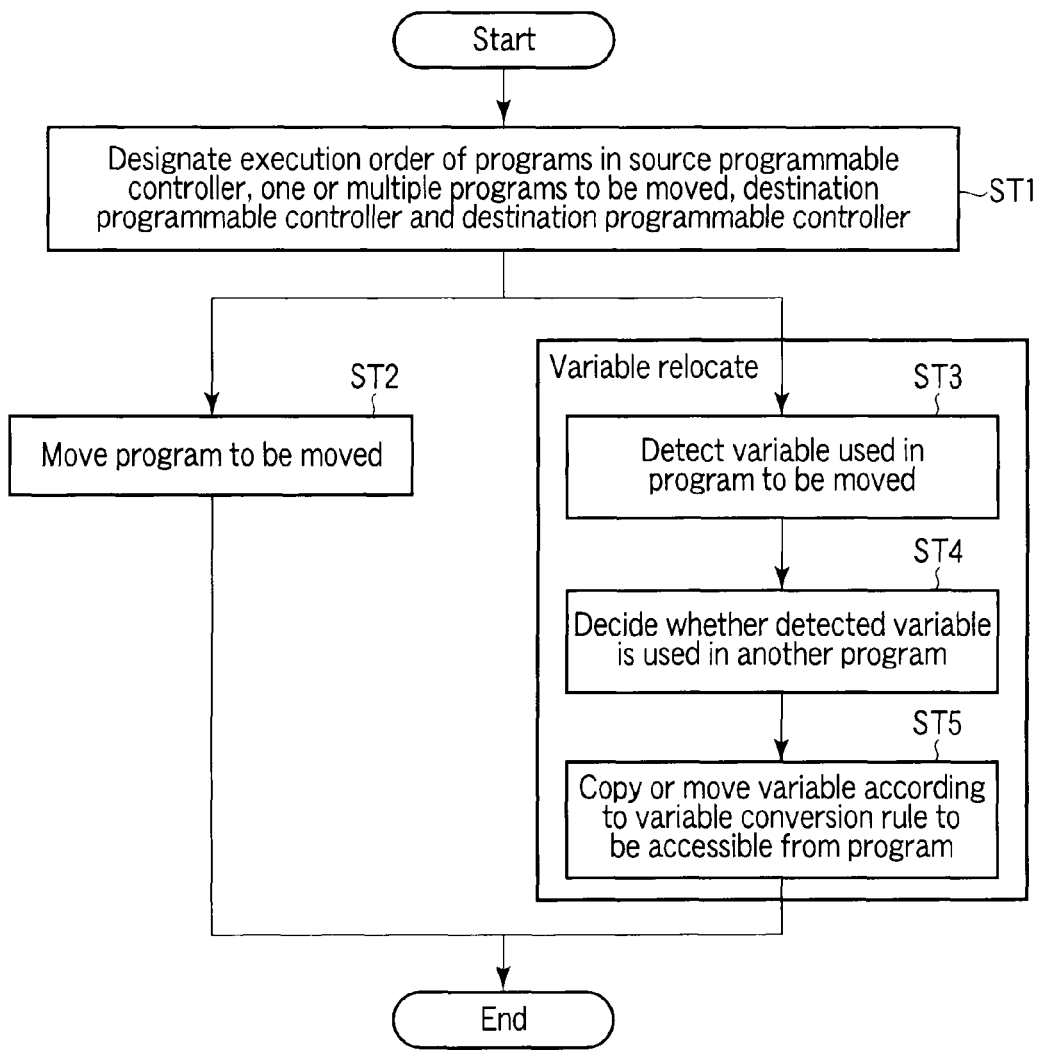
FIG. 2B is a flowchart for explaining exemplary operations of the relocate management part of the plant control system shown in FIG. 1.

FIG. 2B shows a flowchart for explaining exemplary operations of the relocate management part 110.

The relocate management part 110 designates, an execution order of programs in a source programmable controller PC, one or a plurality of programs to be moved, a destination programmable controller PC and the destination programmable controller PC based on an operation signal from the input device when a program is moved (step ST1).

Subsequently, the program to be moved is moved as designated in step ST1 (step ST2). At this time, a variable used in the program to be moved is detected (step ST3), and a decision is made as to whether the detected variable is being used in another program (step ST4). Then, the detected variable is moved or copied to be accessible from the program to be moved according to a variable conversion rule set by the user (step ST5).

The operations of the plant control system when performing the program relocate processing will be described below. A case will be described in which the program MS010 recorded in the programmable controller PC0 is moved to the programmable controller PC1.

FIGS. 3, 4, 5 and 6 show examples of the relocate screen for designating a movement destination of a program. FIG. 3 shows an example of a screen 112A for designating a movement destination of a program. The screen 112A is displayed by the movement designating module 114. The screen 112A displays thereon a movement source column in which a source program is displayed, a movement destination column for designating a destination station ST and a destination programmable controller PC, an "OK" button, and a "cancel" button.

The movement source column displays therein a source station name, a programmable controller name, a pull-down column for designating a program task name, a "select all" button, a "cancel all" button, and a list of programs. The list of programs is displayed as a table in which a task entry number, a program name and a comment for each program are displayed.

The movement destination column displays therein a pull-down column for designating a destination station, a pull-down column for designating a programmable controller, a pull-down column for designating a program task name, a "clear" button, a "clear all" button, a "start movement" button, and a list of programs. The list of programs is displayed in a table whose display items include a task entry number, a program name and a comment for each program.

After a destination station and a destination controller are designated in the movement destination column, a program to be moved is selected from the list of programs in the movement source column, and the mouse cursor is dragged and dropped on a row of the "task entry number" to be moved in the "movement destination" column. When "*" is displayed on the row of the "task entry number" as a temporary movement destination and the "start movement" button is clicked, a screen 112B for defining a rule of the variable to be changed along with the movement of the program is displayed.

Figure 4:
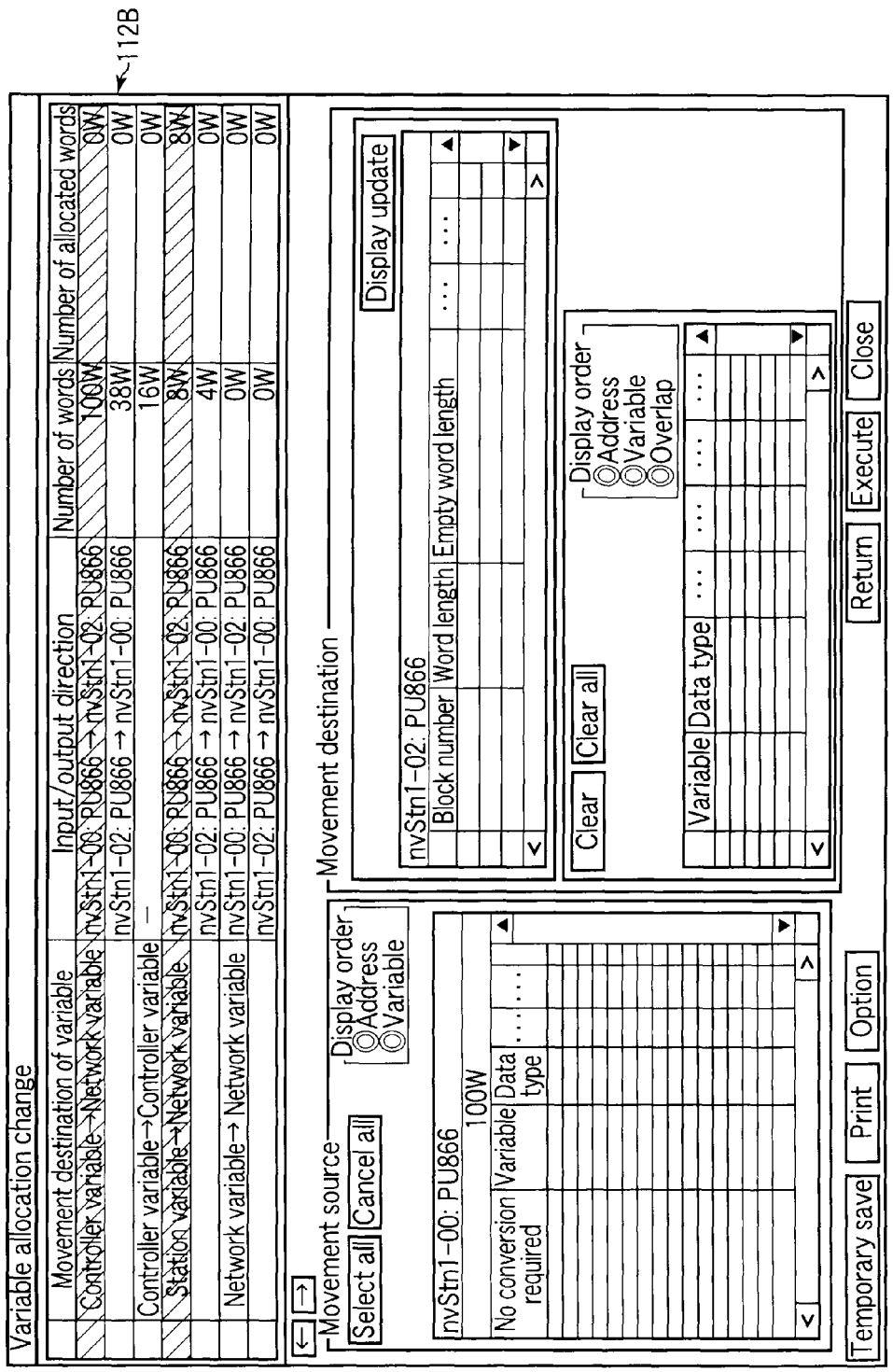
FIG. 4 is a diagram showing an example of the relocate screen when a variable is moved or copied in the plant control system shown in FIG. 1.

FIG. 4 shows an example of the screen 112B for defining the conversion rule for a variable to be changed along with the movement of the program. The screen 112B is displayed by the movement designating module 114. The variables to be changed are classified into types and displayed at the top of the screen 112B. The type of variable is a type of the variable changing rule such as a movement of a controller global variable to a network variable, and a movement or copy of a controller global variable to a controller global variable in another programmable controller. A program input/output direction and the number of words are displayed at the top of the screen 112B depending on the type of variable When any type is selected at the top of the screen 112B, required information is displayed at the bottom of the screen 112B. Information required for moving a controller global variable to a network variable is displayed at the bottom of the screen 112B shown in FIG. 4.

A variable name and a data type for a source controller global variable are displayed at the bottom of the screen 112B. In addition, a value of the source controller global variable and the comment may be presented to the user. The items of information are presented so that the user can reduce the work of designating a source variable.

The display order column for changing an order of displaying the list of variables is displayed in the movement source column at the bottom of the screen 112B. When the user operates the mouse 130 or the like to select "address" in the display order column, for example, the variables are displayed in the order of variable addresses in the list of variables. When the user operates the mouse 130 or the like to select "variable" in the display order column, for example, the variable names are displayed in the alphabetical order in the list of variables.

The block number and a word length are displayed for the destination network variable. In addition, an empty word length, a sending speed and a transmission node for a network variable may be further presented to the user. When the destination block number is designated, a variable name and a data type for the network variable recorded in a designated talker block TBK are displayed at the bottom of the movement destination column. In addition, a comment, an I/O speed, a task designation and a word length for the network variable may be further displayed at the bottom of the movement destination column.

A display order column for changing the display order of the list of variables is displayed at the bottom of the movement destination column. When the user operates the mouse 130 or the like to select "address" in the display order column, for example, the variables are displayed in the order of variable addresses in the list of variables. When the user operates the mouse 130 or the like to select "variable" in the display order column, for example, the variable names are displayed in the alphabetical order in the list of variables. When the user operates the mouse 130 or the like to select "overlap" in the display order column, for example, the overlapping variable names are displayed at the top of the list of variables.

A talker block TBK for the destination network variable is designated in advance at the top of the movement destination column at the bottom of the screen 112B. Then, the user selects a variable to be moved in the "movement source" column (multiple variables may be selected) to drag and drop the mouse on a movement-desired position at the lower right of the "movement destination" screen. At this time, the relocate management part 110 decides whether the variable name overlaps with another, and when the same variable name is present in the movement destination, displays the overlapping variable name by reverse display. If the conversion is not required, the user operates the mouse or the like to click the "no conversion required" item column, thereby removing the variable from the conversion target.

FIG. 5 shows an example of a screen in which a controller global variable is moved to a controller global variable in another programmable controller PC. For example, the bottom of the screen 112B of FIG. 4 is displayed as in a screen 112C. The screen 112C is displayed by the movement designating module 114.

The screen 112C displays therein a movement source column, a movement destination column, a "temporary save" button, a "print" button, an "option" button, a "return" button, an "execute" button and a "close" button.

The movement source column displays therein a "select all" button, a "cancel all" button, a variable name of a source controller global variable, a data type, a value and a comment. The movement destination column displays therein a "clear" button, a "clear all" button, a variable name of a destination controller global variable, a data type, a value and a comment.

The user selects a variable to be moved in the movement source column (multiple variables may be selected) to drag and drop the mouse on a desired position in the movement destination column. At this time, the relocate management part 110 decides whether the variable name overlaps with another, and when the same variable name is present in the movement destination, displays the overlapping variable name by reverse display. The user clicks the "no conversion required" item column for the variable which does not require conversion, thereby removing the variable from the conversion target.

Further, when the variable name conversion rule is defined, the variable naming rule may be decided for the controller global variable or the network variable so that a difference therebetween can be found in the design. For example, for the controller global variable, the prefix of the variable is assumed as "G_", and for the network variable, the prefix of the variable name is assumed as "L_."

In other words, the name setting module 118C of the relocate management part 110 displays a screen for changing the prefix of the variable name when the program is moved. That is, the relocate management part 110 comprises a module configured to convert (move or copy) a variable automatically according to a conversion rule, a module configured to define the conversion rule, a module configured to manually change the variable name when the variable is converted, an overlap deciding module 118B configured to decide, when the variable name is changed, whether the changed variable name overlaps with a variable name of an existing network variable, and a name converting module 118D configured to convert a variable name of a program using the variable name to be converted into the changed variable name automatically.

FIG. 6 shows an example of a setting screen configured to, when a variable is moved from a controller global variable to a network variable along with the movement of a program, convert a variable name according to a predetermined rule.

In the present embodiment, the rule is such that "G_?A" is converted into "L_?A", for example. A character pattern "?" is an arbitrary character. Therefore, "G_AA" is converted into "L_AA." Further, "G_#A" is converted into "L_#A." The character pattern "#" is an arbitrary one-byte number. Thus, "G__1A" is converted into "L__1A." Further, "G_*A" is converted into "L_*A." The character pattern "*" is a character string having an arbitrary number of characters. Thus, "G_XYZA" is converted into "L_XYZA."

As described above, the prefix of the variable name is converted so that when the variable is moved along with the movement of the program, the variable name conforms to the variable naming rule in the design.

As described above, in the plant control system and the program relocate method according to the present embodiment, the cost of design works can be reduced and the plant control apparatus and the program relocate method with high quality can be provided.

A plant control system according to a second embodiment will be described below with reference to the drawings. In the following description, similar constituents to those of the plant control system and the program relocate method according to the first embodiment will be denoted with the same reference numerals and an explanation thereof will be omitted.

The plant control system according to the present embodiment has a similar structure to the plant control system according to the first embodiment except for the following points. The plant control system according to the present embodiment is configured so that, when a program is moved and if a function and a function block used in the program are present (CALL), the function and the function block are also moved at the same time.

Figure 7:
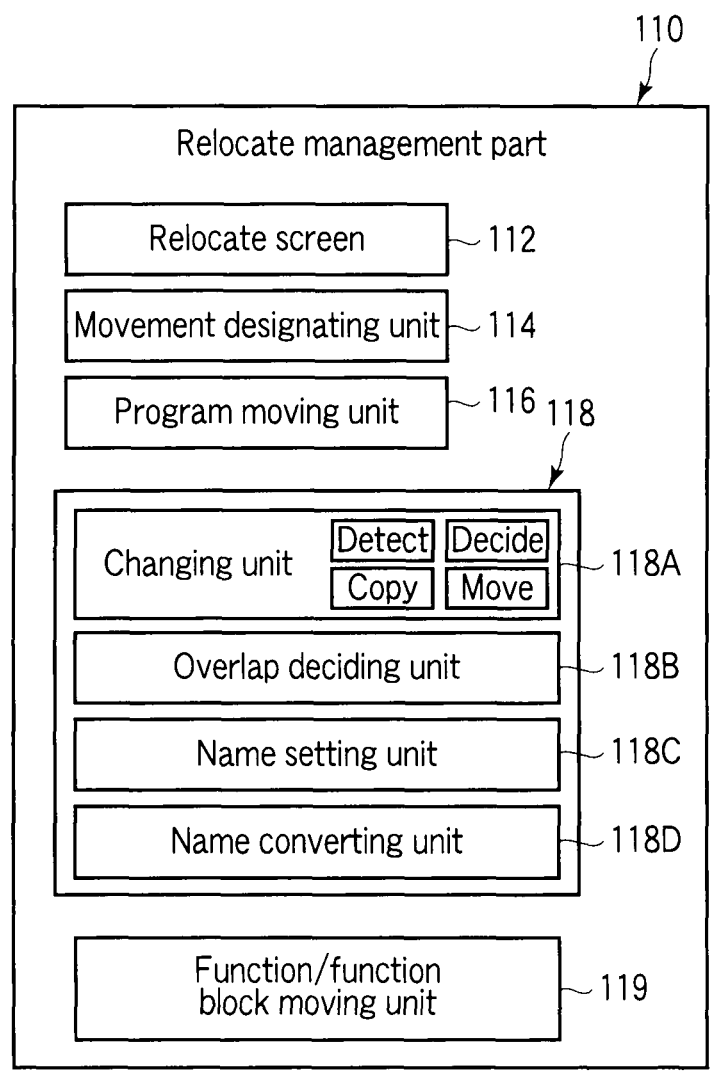
FIG. 7 is a diagram schematically showing a structure example of a relocate management part of a plant control system according to a second embodiment.

FIG. 7 schematically shows a structure example of a relocate management part 110 in the plant control system according to the present embodiment.

In the present embodiment, the relocate management part 110 in an engineering device 100 further comprises a function/function block moving module 119 configured to move a function and a function block.

FIG. 8 shows an example in which when a program MS010 of the relocate management part 110 is moved, the function/function block moving module 119 moves a function and a function block used in the program MS010.

The program MS010 uses a function UserFun1 and a function block UserFBK1, for example. The function block UserFBK1 is used also in a program MS012.

Since the function UserFUN1 is used only in the program MS010, the relocate management part 110 moves the function to a destination programmable controller together with the program MS010. Since the function block UserFBK1 is used also in the program MS012, it is copied to the destination programmable controller.

In other words, when the program MS010 is moved, the relocate management part 110 detects the function and the function block used in the program MS010 and decides whether the function and the function block are being used in another program.

When the function and the function block are not being used in another program, the relocate management part 110 moves the function and the function block to the destination program. When the function and the function block are being used in another program, the relocate management part 110 copies the function and the function block to the destination program.

In the plant control system and the program relocate method according to the present embodiment, the function and the function block are automatically moved or copied when the program is moved as described above so that the user's manual processing can be reduced, the cost of design works can be reduced and the plant control apparatus and the program relocate method with high quality can be provided.

A plant control system and a program relocate method according to a third embodiment will be described below with reference to the drawings. The plant control system according to the present embodiment has a similar structure to the first embodiment.

The present embodiment is configured so that when a source programmable controller comprises a plurality of programs and one or a plurality of programs to be moved inputs/outputs data via a common controller global variable into/from a program not to be moved, the common controller global variable is converted into a network variable.

A changing module 118A of a relocate management part 110 comprises a detecting module configured to detect a controller global variable used in a program to be moved, a deciding module configured to decide whether the controller global variable is being used in another program, a copying module configured to copy a controller global variable, and a moving module configured to move a controller global variable.

Figure 9:
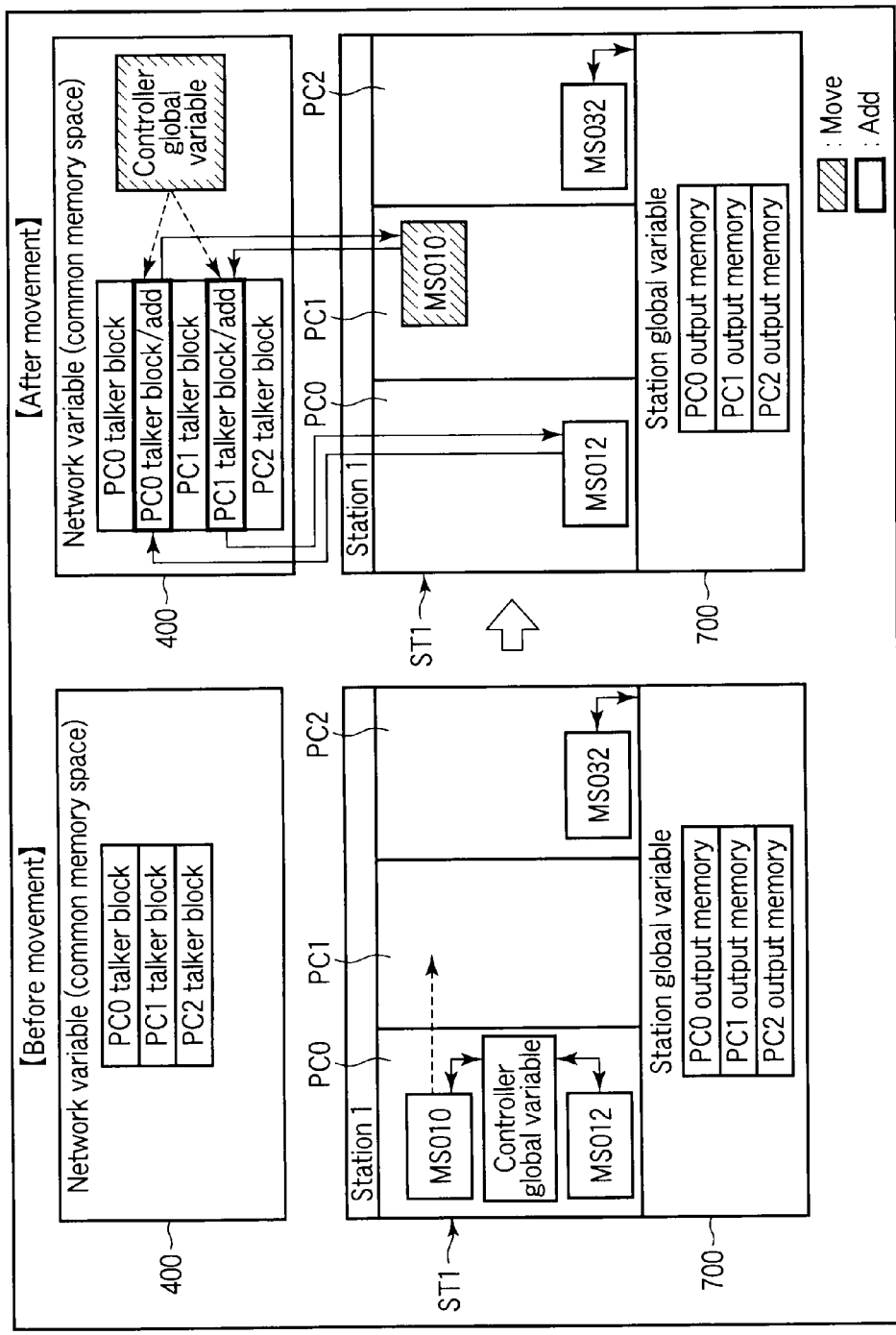
FIG. 9 is a diagram for explaining exemplary operations of a plant control system according to a third embodiment.

FIG. 9 shows an example in which a controller global variable common to a plurality of programs is converted into a network variable. For the relocate management part 110, three programmable controllers PC0, PC1, PC2 are present in a station ST1, and a program MS010 and a program MS012 are present in the programmable controller PC0. The program MS010 and the program MS012 input/output data via a controller global variable in the programmable controller PC0, respectively, to conduct plant control.

At this time, the relocate management part 110 moves the program MS010 from the programmable controller PC0 to the programmable controller PC1. Along with this, the relocate management part 110 automatically moves the controller global variable used in the two programs MS010 and MS012 to a network variable accessible from the programmable controller PC0 and the programmable controller PC1.

At this time, the relocate management part 110 adds a talker block of the programmable controller PC0 and a talker block of the programmable controller PC1 to a common memory space 400. The relocate management part 110 transmits change information to a database management part 120 along with the program relocate processing, and the data management part 120 updates the information stored in first database DB1 and second database DB2. When moving the controller global variable to the network variable, the relocate management part 110 changes the variable name according to a set conversion rule.

The relocate management part 110 moves the variable according to the conversion rule as described above, defines the variable conversion rule, enables the variable name to be manually changed when the variable is converted, when the variable name is changed, decides whether the changed variable name overlaps with a variable name of an existing network variable, and automatically converts a variable name of a program using the variable name to be converted into the changed variable name.

In the plant control system and the program relocate method according to the present embodiment, the common controller global variable is converted into the network variable as described above so that the user's manual processing can be reduced, the cost of design works can be reduced and the plant control apparatus and the program relocate method with high quality can be provided.

A plant control system and a program relocate method according to a fourth embodiment will be described below with reference to the drawings. The plant control system according to the present embodiment has a similar structure to the first embodiment except for the following points.

The present embodiment is configured so that when a source programmable controller comprises a plurality of programs and data is input/output via a controller global variable used only in one or a plurality of programs to be moved, the used controller global variable may be moved together with the program.

A changing module 118A of a relocate management part 110 further comprises a detecting module configured to detect a controller global variable used in a program to be moved, a deciding module configured to decide whether the controller global variable is being used in another program, a copying module configured to copy a controller global variable common to another program, and a moving module configured to move a controller global variable used only in the program to be moved.

Figure 10:
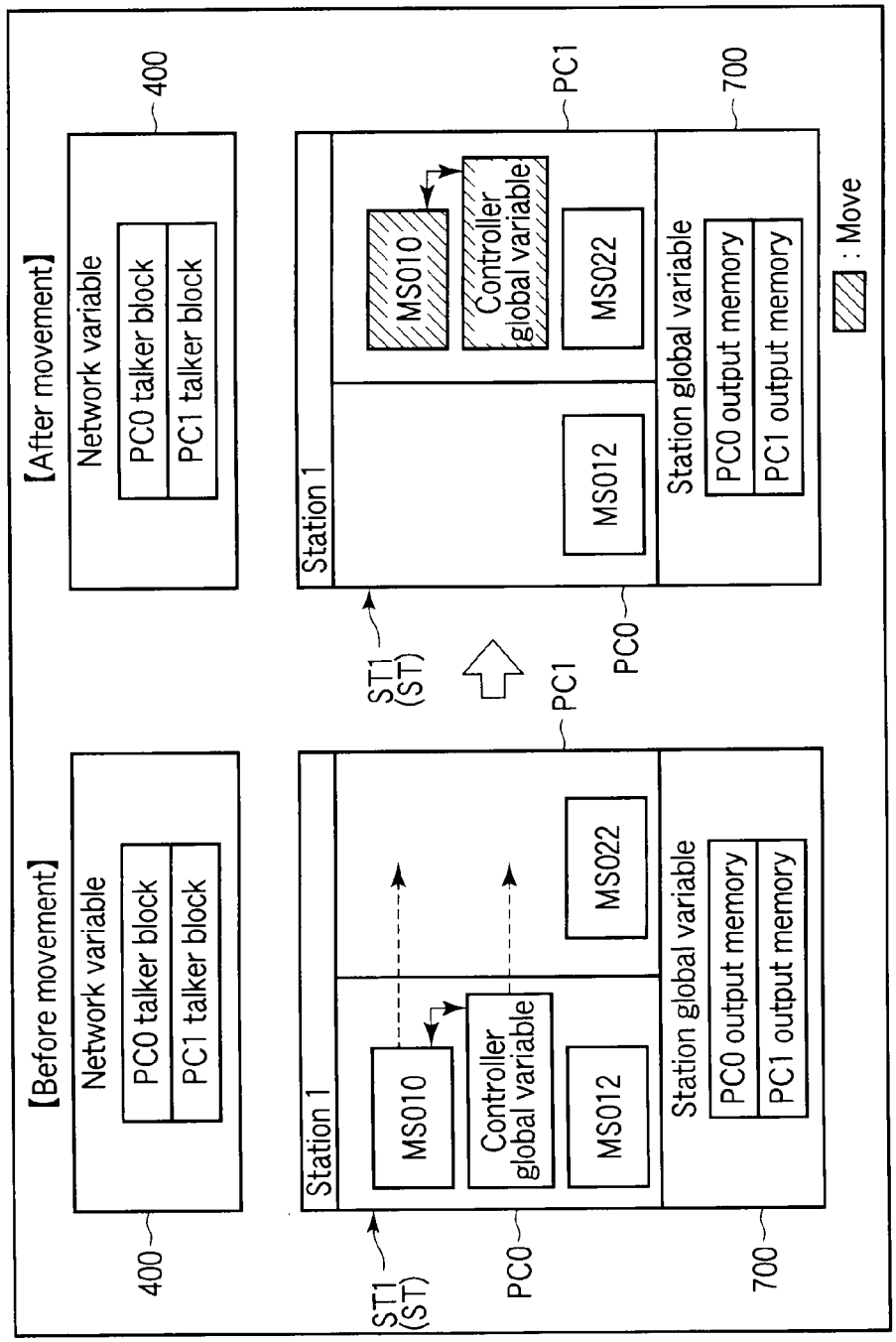
FIG. 10 is a diagram for explaining exemplary operations of a plant control system according to a fourth embodiment.

FIG. 10 shows an example in which when a controller global variable used in one or a plurality of programs to be moved is used to input/output data into/from a program not to be moved, the controller global variable is moved.

Two programmable controllers PC0 and PC1 are present in a station ST1, a program MS010 and a program MS012 are present in the programmable controller PC0. The program MS010 and the program MS012 input/output data via a controller global variable in the programmable controller PC0, respectively, but the data is not exchanged between the program MS010 and the program MS012 and the same variable is not accessed.

At this time, the relocate management part 110 moves the controller global variable used in the program MS010 from the programmable controller PC0 to the programmable controller PC1 along with the movement of the program MS010 to the programmable controller PC1.

The relocate management part 110 converts a variable according to a conversion rule as described above, defines the conversion rule, enables a variable name to be manually changed when the variable is converted, checks whether the variable name of the controller global variable overlaps with a variable name already used in the destination programmable controller PC1, when the variable name overlaps with another, converts the variable name of the controller global variable used in the program MS010 to be moved, and automatically converts the variable name used in the program MS010 into the changed variable name.

Figure 11:
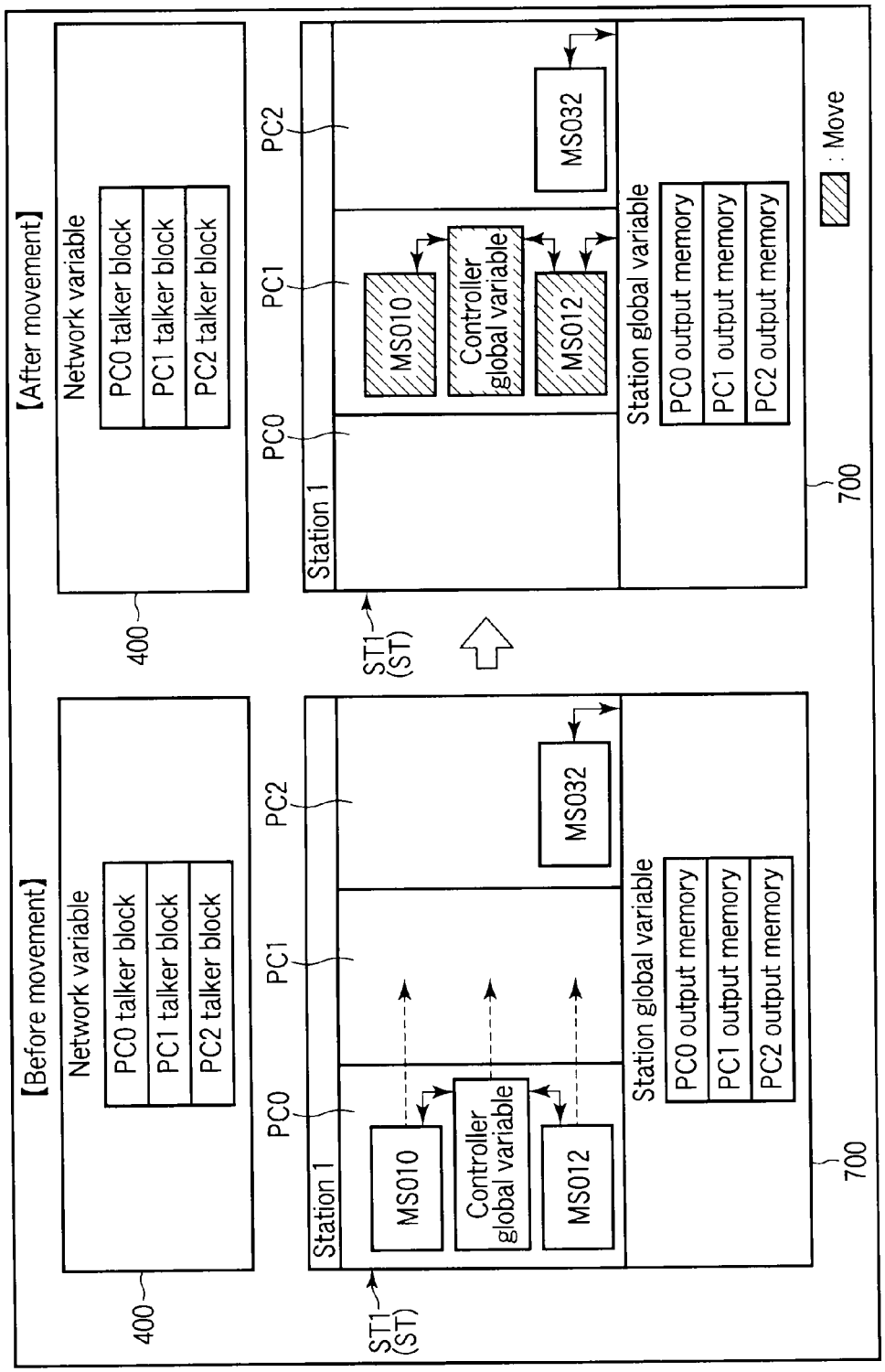
FIG. 11 is a diagram for explaining exemplary operations of the plant control system according to the fourth embodiment.

FIG. 11 shows another example in which when a controller global variable used in one or a plurality of programs to be moved is used to input/output data into/from a program not to be moved, the controller global variable is moved.

An example in which the program MS010 and the program MS012 are moved from the programmable controller PC0 to the programmable controller PC1 will be described below. The program MS010 and the program MS012 input/output data via a common controller global variable. The controller global variable is not used in another program.

When the program MS010 and the program MS012 are moved, a program using the controller global variable originally used in these programs is not present and thus the relocate management part 110 moves the controller global variable to the programmable controller PC1 together.

In the plant control system and the program relocate method according to the present embodiment, the common controller global variable is moved together with the program as described above so that the user's manual processing can be reduced, the cost of design works be reduced and the plant control apparatus and the program relocate method with high quality can be provided.

A plant control system and a program relocate method according to a fifth embodiment will be described below with reference to the drawings. The plant control system according to the present embodiment has a similar structure to the first embodiment except for the following points.

The present embodiment is configured so that, when a source programmable controller comprises a plurality of programs and one or a plurality of programs to be moved input/output data via a controller global variable into/from a program not to be moved, the controller global variable is converted into a station global variable.

A changing module 118A of a relocate management part 110 comprises a detecting module configured to detect a controller global variable used in a program to be moved, a deciding module configured to decide whether the controller global variable is being used in another program, and a moving module configured to convert a controller global variable common to another program into a station global variable.

Figure 12:
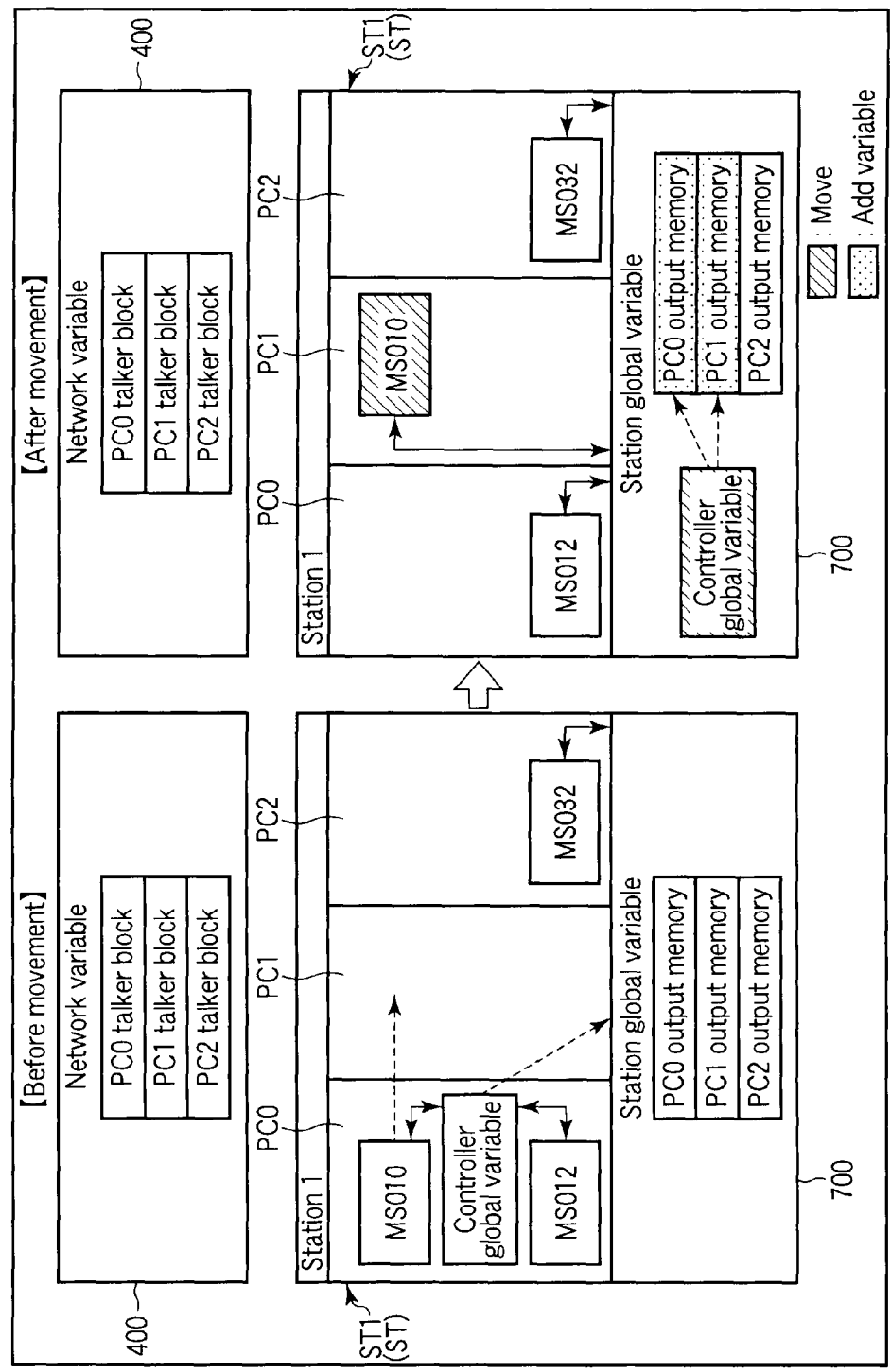
FIG. 12 is a diagram for explaining exemplary operations of a plant control system according to a fifth embodiment.

In FIG. 12, a station ST1 comprises three programmable controllers PC0, PC1, PC2, and the programmable controller PC0 comprises a program MS010 and a program MS012. The program MS010 and the program MS012 input/output data via a controller global variable in the programmable controller PC0, respectively, to conduct plant control.

At this time, the relocate management part 110 moves the program MS010 to the programmable controller PC1. The relocate management part 110 moves the controller global variable used in the program MS010 and the program MS012 to a station global variable accessible from the programmable controller PC0 and the programmable controller PC1 along with the movement of the program.

The relocate management part 110 moves a variable according to a conversion rule as described above, defines the variable conversion rule, enables a variable name to be manually changed when the variable is converted, when the variable name is changed, decides whether the changed variable name overlaps with a variable name of an existing station global variable, and automatically converts a variable name of a program using the variable name to be converted into the changed variable name. Thus, the relocate management part 110 changes the variable name according to the conversion rule when moving the controller global variable to the station global variable.

In the plant control system and the program relocate method according to the present embodiment, the common controller global variable is converted into the station global variable as described above so that the user's manual processing can be reduced, the cost of design works can be reduced and the plant control apparatus and the program relocate method with high quality can be provided.

A plant control system and a program relocate method according to a sixth embodiment will be described below with reference to the drawings. The plant control system according to the present embodiment has a similar structure to the first embodiment except for the following points.

The plant control system according to the present embodiment is configured so that, when a station global variable used in one or a plurality of programs to be moved does not input/output data into/from a program not to be moved, the station global variable is converted into a controller global variable.

A changing module 118A of a relocate management part 110 comprises a detecting module configured to detect a station global variable used in a program to be moved, a deciding module configured to decide whether the station global variable is being used in another program, and a moving module configured to convert the station global variable not used in another program into a controller global variable.

Figure 13:
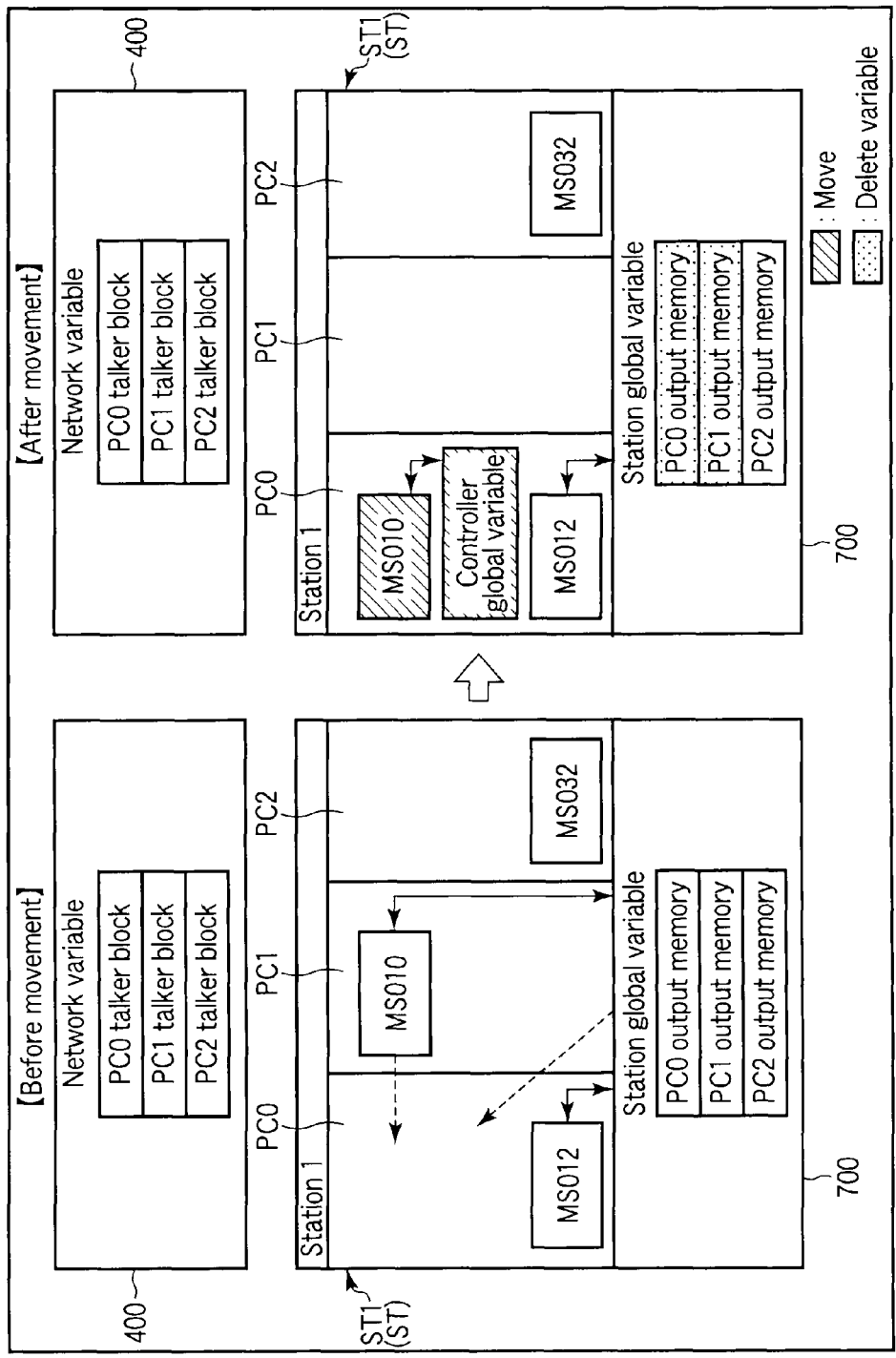
FIG. 13 is a diagram for explaining exemplary operations of a plant control system according to a sixth embodiment.

In FIG. 13, a station ST1 comprises three programmable controllers PC0, PC1, PC2. The programmable controller PC0 comprises a program MS012 and the programmable controller PC1 comprises a program MS010.

The program MS010 and the program MS012 input/output data via a station global variable, respectively, to conduct plant control. It is assumed that the station global variable is used only in the program MS010 and the program MS012, and is not used in other programs.

At this time, the relocate management part 110 moves the program MS010 to the programmable controller PC0. Along with this, the relocate management part 110 moves the station global variable used in the program MS010 and the program MS012 to the controller global variable of the programmable controller PC0.

The relocate management part 110 converts a variable according to a conversion rule as described above, defines the conversion rule, enables a variable name to be manually changed when the variable is converted, when the variable name is changed, decides whether the changed variable name overlaps with a variable name of an existing controller global variable, and automatically converts a variable name of a program using the variable name to be converted into the changed variable name. Thus, when moving the station global variable to the controller global variable, the relocate management part 110 changes the variable name according to the conversion rule.

In the plant control system and the program relocate method according to the present embodiment, the station global variable is converted into the controller global variable as described above so that the user's manual processing can be reduced, the cost of design works can be reduced and the plant control apparatus and the program relocate method with high quality can be provided.

A plant control system and a program relocate method according to a seventh embodiment will be described below with reference to the drawings. The plant control system according to the present embodiment has a similar structure to the first embodiment except for the following points.

The plant control system according to the present embodiment moves one or a plurality of programs to be moved among programmable controllers provided in different stations.

The plant control system and the program relocate method according to the present embodiment is configured to move one or a plurality of programs of the programmable controller to another programmable controller connected to the same station in the data sending device without changing the logic of the program.

A relocate management part 110 comprises a movement designating module 114 configured to designate an execution order of programs in a source programmable controller, one or a plurality of programs to be moved, a destination programmable controller, and the source programmable controller.

Further, when one or a plurality of programs input/output data via a controller global variable into/from a program not to be moved, a variable changing module 118 of the relocate management part 110 converts the controller global variable into a network variable, automatically converts a variable name according to a variable name conversion rule when the variable is converted, defines the variable name conversion rule, enables a variable name to be manually changed when the variable is converted, when a variable name is changed, decides whether the changed variable name overlaps with a variable name of an existing network variable, and converts a variable name of a program using the variable name to be converted into the changed variable name.

When one or a plurality of programs input/output data via a controller global variable into/from a program not to be moved, the relocate management part 110 converts the controller global variable into a station global variable according to a conversion rule, defines the conversion rule, enables a variable name to be manually changed when the variable is converted, when the variable name is changed, decides whether the changed variable name overlaps with a variable name of an existing station global variable, and converts a variable name of a program using the variable name to be converted into the changed variable name.

An example will be described below in which a source programmable controller is configured of a plurality of programs and one or a plurality of programs to be moved input/output data via a controller global variable into/from a program not to be moved, the controller global variable is converted into a network variable when the program is moved to another station.

FIG. 14 shows a system structure example of the plant control system before and after a program is moved from a source programmable controller to a programmable controller in a different station.

The plant control system comprises two stations ST1, ST2. The station ST1 comprises three programmable controllers PC0, PC1, PC2. The programmable controller PC0 comprises a program MS010 and a program MS012.

The program MS010 and the program MS012 input/output data via a common controller global variable in the programmable controller PC0, respectively, to conduct plant control.

The station ST2 comprises three programmable controllers PC3, PC4, PC5. The programmable controller PC3 comprises a program MS212. The programmable controller PC5 comprises a program MS232.

At this time, the relocate management part 110 moves the program MS010 to the programmable controller PC4 in the station ST2. Along with this, the controller global variable used in the two programs MS010 and MS012 is moved to a network variable accessible from the programmable controller PC0 and the programmable controller PC4.

At this time, the relocate management part 110 adds a talker block of the programmable controller PC0 and a talker block of the programmable controller PC4 to a common memory space 400, and moves the controller global variable to the added talker blocks to be a network variable. Further, the output sources of the talker block of the programmable controller PC0 and the talker block of the programmable controller PC5 in the common memory space 400 are changed.

A changing module 118A of the relocate management part 110 converts a variable according to a conversion rule as described above, defines the conversion rule, enables a variable name to be manually changed when the variable is converted, when the variable name is changed, decides whether the changed variable name overlaps with a variable name of an existing network variable, and converts a variable name of a program using the variable name to be converted into the changed variable name. Thus, when moving the controller global variable to the network variable, the relocate management part 110 changes the variable name according to the conversion rule.

In the plant control system and the program relocate method according to the present embodiment, the controller global variable is converted into the network variable as described above so that the user's manual processing can be reduced, the cost of design works can be reduced, and the plant control apparatus and the program relocate method with high quality can be provided.

A plant control system and a program relocate method according to an eighth embodiment will be described below with reference to the drawings. The plant control system according to the present embodiment has a similar structure to the second embodiment except for the following points.

In the present embodiment, when a program is moved, if a function and a function block used in the program are present, the function and the function block can be also moved at the same time.

In the present embodiment, a relocate management part 110 comprises a module configured to enable a function and a function block to be moved at the same time when the function and the function block used in a program to be moved are present.

Figure 15:
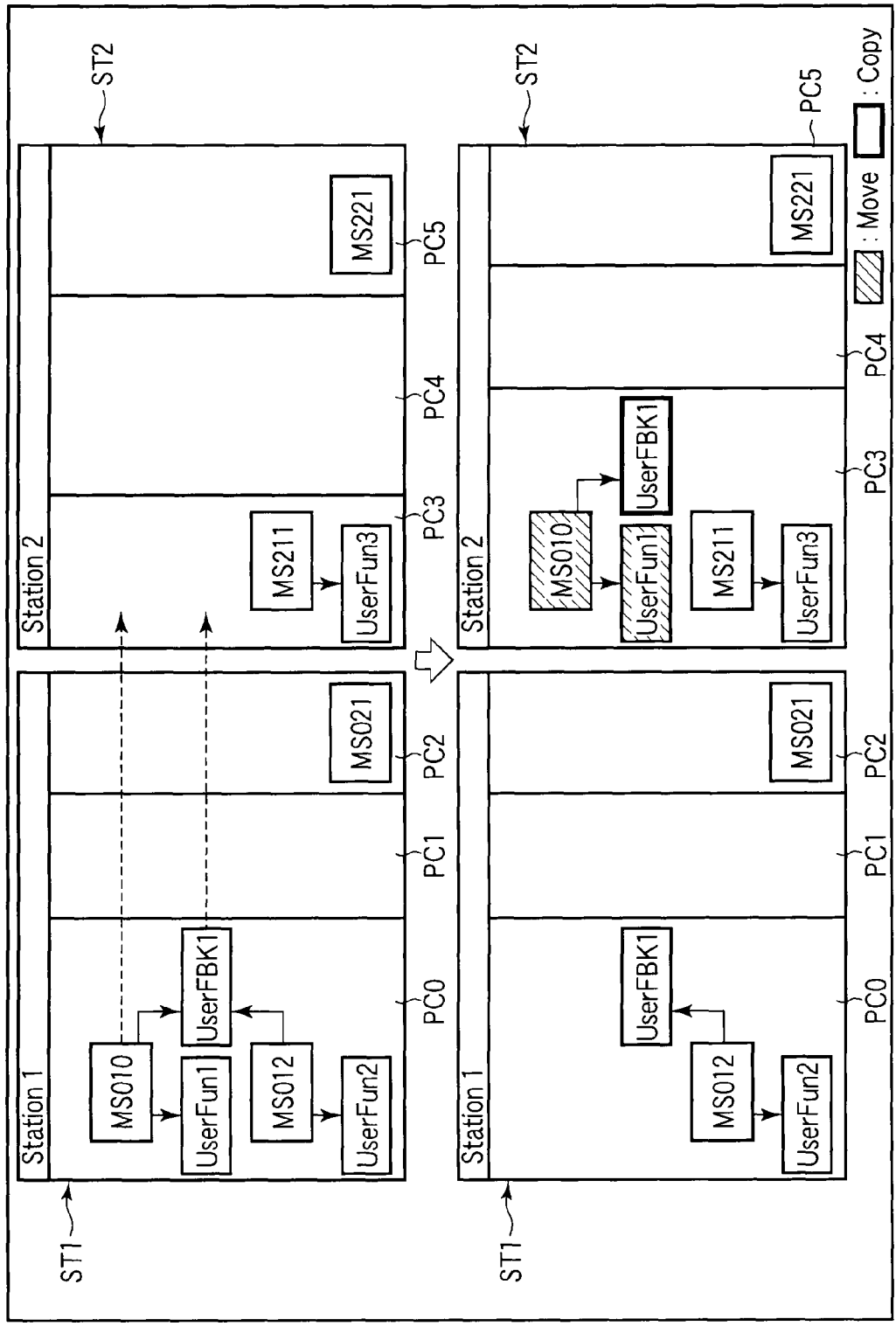
FIG. 15 is a diagram for explaining exemplary operations of a plant control system according to an eighth embodiment.

FIG. 15 shows a structure example of a station ST1 and a station ST2 when a function and a function block are moved along with a program to be moved.

The station ST1 comprises three programmable controllers PC0, PC1, PC2.

The programmable controller PC0 comprises a program MS010, a program MS012, a function UserFUN1, a function UserFUN2, and a function block UserFBK1. The programmable controller PC2 comprises a program MS013.

The station ST2 comprises three programmable controllers PC3, PC4, PC5. The programmable controller PC3 comprises a program MS211 and a function UserFUN3. The programmable controller PC5 comprises a program MS221.

In the present embodiment, when the program MS010 is moved from the programmable controller PC0 in the station ST1 to the programmable controller PC3 in the station ST2, for example, the function UserFun1 and the function block UserFBK1 used in the program MS010 (CALL) are also to be moved. At this time, when the function and the function block are not being used in another program, they are moved, and when they are being used in another program, they are copied.

In the example of FIG. 15, since only the program MS010 uses the function UserFUN1, a function/function moving module 119 moves the function UserFUN1 to the destination station ST2 together with the program MS010.

Since the function block UserFBK1 is used not only in the program MS010 but also in the program MS012, it is copied to the destination station ST2.

In the plant control system and the program relocate method according to the present embodiment, the function and the function block are automatically moved or copied when moving the program as described above so that the user's manual processing can be further reduced, the cost of design works can be reduced and the plant control apparatus and the program relocate method with high quality can be provided.

A plant control system and a program relocate method according to a ninth embodiment will be described below with reference to the drawings. The plant control system according to the present embodiment has a similar structure to the first embodiment except for the following points.

An example of the present embodiment will be described in which when a source programmable controller comprises a plurality of programs and one or a plurality of programs to be moved input/output data via a common station global variable into/from a program not to be moved, the station global variable is converted into a network variable when the program is moved to another station.

FIG. 16 shows a structure example of the plant control system when one or a plurality of programs to be moved input/output data via a station global variable into/from a program contained in a different programmable controller in a station on which a source programmable controller is mounted.

In the present embodiment, a variable changing module 118 of a relocate management part 110 comprises a changing module 118A configured to convert a station global variable into a network variable automatically, a module configured to convert a variable name automatically according to a variable name conversion rule when the variable is converted, a module configured to define a variable name conversion rule, a name setting module 118C configured to enable a variable name to be manually changed when the variable is converted, a deciding module 118B configured to, when the variable name is changed, decide whether the changed variable name overlaps with a variable name of an existing network variable, and a name converting module 118D configured to convert a variable name of a program using the variable name to be converted into the changed variable name.

A station ST1 comprises three programmable controllers PC0, PC1, PC2. The programmable controller PC0 comprises a program MS010 and a program MS012.

The program MS010 and the program MS012 input/output data via a station global variable in the station ST1, respectively, to conduct plant control.

At this time, the relocate management part 110 moves the program MS010 to the programmable controller PC1 in the station ST2. Along with this, the station global variable used in the two programs MS010 and MS012 is moved to a network variable accessible from the two programmable controllers PC3, PC4 in the station ST2.

At this time, the relocate management part 110 adds a talker block of the programmable controller PC0 and a talker block of the programmable controller PC4 to a common memory space 400, and moves the station global variable to the added talker blocks to be a network variable. Further, the output sources of the talker block of the programmable controller PC0 and the talker block of the programmable controller PC5 are changed in the common memory space 400.

Further, the relocate management part 110 enables a variable name to be manually changed when a variable is converted, when the variable name is changed, decides whether the changed variable name overlaps with a variable name of an existing network variable, and converts a variable name of a program using the variable name to be converted into the changed variable name. Thus, when moving the station global variable to the network variable, the relocate management part 110 changes the variable name according to the conversion rule.

In the plant control system and the program relocate method according to the present embodiment, the station global variable is converted into the network variable as described above so that the user's manual processing can be reduced, the cost of design works can be reduced and errors due to the manual processing can be prevented, thereby designing a program with high quality.

When a station global variable used in one or a plurality of programs to be moved is not used to input/output data into/from a program not to be moved, the relocate management part 110 converts the station global variable into the controller global variable according to the conversion rule, defines the conversion rule, enables a variable name to be manually changed when the variable is converted, decides whether the variable name overlaps with a variable name of a controller global variable already used in a destination programmable controller, when the variable name overlaps with another, converts the variable name of the station global variable used in the program to be moved, and converts the variable name used in the program into the change variable name.

Even when the plant control system and the program relocate method are configured as described above, the station global variable is converted into the controller global variable so that the user's manual processing can be reduced, the cost of design works can be reduced, and the plant control apparatus and the program relocate method with high quality can be provided.

A plant control system and a program relocate method according to a tenth embodiment will be described below with reference to the drawings. The plant control system according to the present embodiment has a similar structure to the first embodiment except for the following points.

In the present embodiment, when a controller global variable used in one or a plurality of programs to be moved is not used to input/output data into/from a program not to be moved, the controller global variable is moved.

A relocate management part 110 according to the present embodiment comprises an overlap deciding module 118C configured to, when a controller global variable used in one or a plurality of programs to be moved is not used to input/output data into/from a program not to be moved, decide whether the variable name of the controller global variable overlaps with a variable name of a controller global already used in a destination programmable controller, a name setting module 118C configured to, when the variable name overlaps with another, convert the variable name of the controller global variable used in the program to be moved, and a name converting module 118D configured to convert the variable name used in the program into the changed variable name automatically.

FIG. 17 shows a structure example of a station before and after a program is moved. A station ST1 comprises three programmable controllers PC0, PC1, PC2. The programmable controller PC0 comprises a program MS010 and a program MS012. The programmable controller PC1 comprises a program MS021.

The program MS010 and the program MS012 input/output data via a controller global variable in the programmable controller PC0, respectively, but the data is not input/output between the two programs and thus a common variable is not accessed.

A station ST2 comprises three programmable controller PC3, PC4, PC5. The programmable controller PC3 comprises a program MS211. The programmable controller PC5 comprises a program MS221.

At this time, the relocate management part 110 moves the program MS010 to the programmable controller PC4 in the station ST2. Along with this, the relocate management part 110 moves the controller global variable used in the program MS010 from the programmable controller PC0 to the programmable controller PC4.

FIG. 18 shows an example in which data is exchanged via a common controller global variable only between the program MS010 and the program MS012. When the program MS010 and the program MS012 are moved from the programmable controller PC0 to the programmable controller PC4, there will not be present a program using the controller global variable originally used in the programmable controller PC0. In this case, the relocate management part 110 also moves also the controller global variable to the programmable controller PC4 together with the program MS010 and the program MS012.

The relocate management part 110 decides whether the variable name of the controller global variable overlaps with a variable name of a controller global variable already used in the programmable controller PC4 to be moved, when the variable name overlaps with another, converts the variable name of the controller global variable used in the program to be moved, and converts the variable name used in the program into the changed variable name. Thus, when moving the controller global variable, the relocate management part 110 changes the variable name according to the conversion rule.

In the plant control system and the program relocate method according to the present embodiment, the controller global variable is moved as described above so that the user's manual processing can be reduced, the cost of design works can be reduced, and the plant control apparatus and the program relocate method with high quality can be provided.

A plant control system and a program relocate method according to an eleventh embodiment will be described below with reference to the drawings. The plant control system according to the present embodiment has a similar structure to the first embodiment except for the following points.

In the present embodiment, when a station global variable used in one or a plurality of programs to be moved is not used to input/output data into/from a program not to be moved, the station global variable is converted into a controller global variable when moving to a programmable controller in a different station.

The plant control system according to the present embodiment comprises a module configured to convert the station global variable automatically into a controller global variable according to a conversion rule when a station global variable used in one or a plurality of programs to be moved is not used to input/output data into/from a program not to be moved, a module configured to define the conversion rule, a module configured to enable a variable name to be manually changed when the variable is converted, a module configured to decide whether the variable name overlaps with a variable name of a controller global variable already used in a destination programmable controller, a module configured to, when the variable name overlaps with another, convert the variable name of the station global variable used in the program to be moved, and a module configured to convert the variable name used in the program into the changed variable name.

Figure 19:
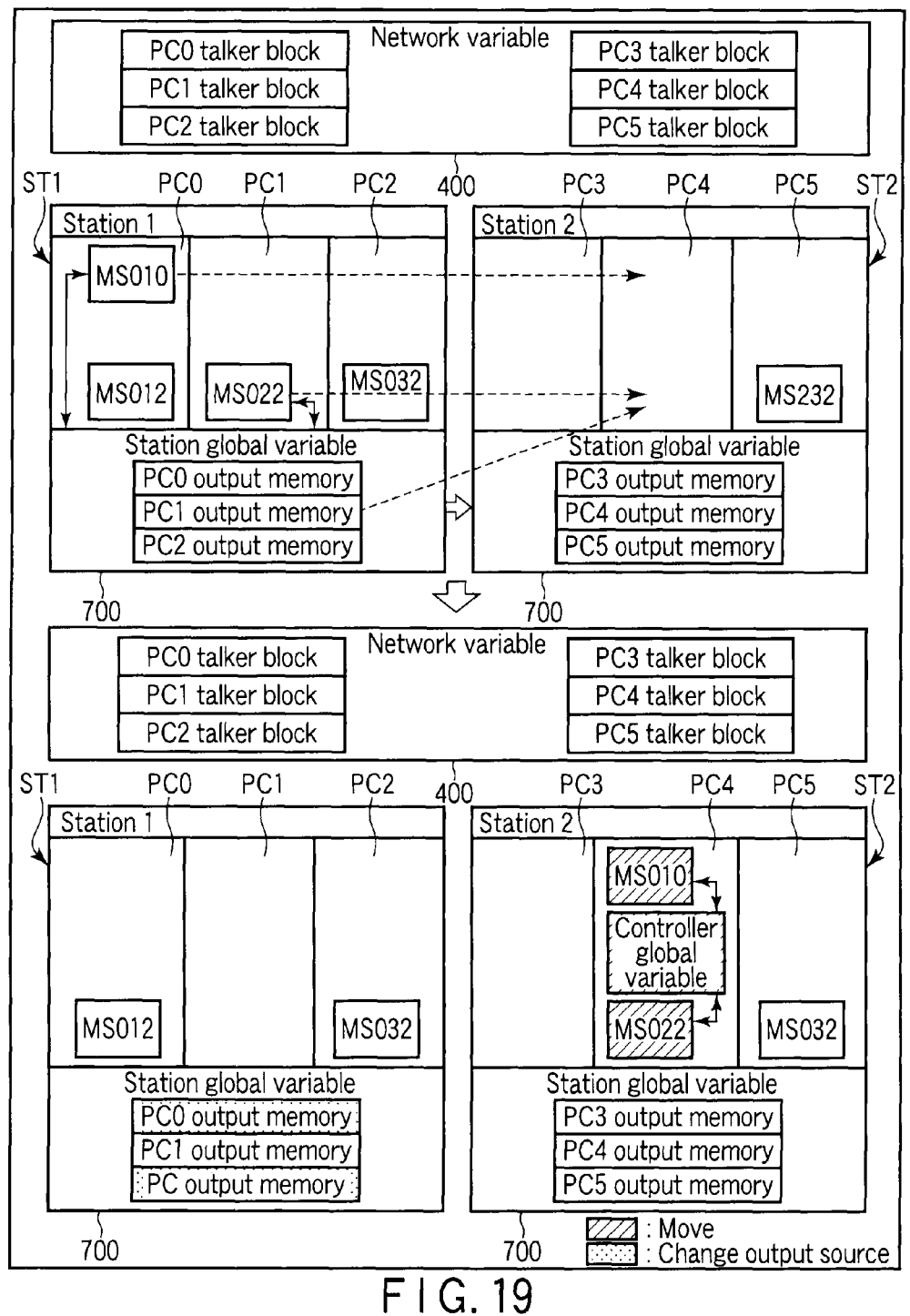
FIG. 19 is a diagram for explaining exemplary operations of a plant control system according to an eleventh embodiment.

FIG. 19 shows a structure example of a station before and after a program is moved. A station ST1 comprises three programmable controllers PC0, PC1, PC2. The programmable controller PC0 comprises a program MS010 and the programmable controller PC1 comprises a program MS022.

The program MS010 and the program MS022 input/output data via a station global variable, respectively, to conduct plant control. The program MS010 inputs/outputs data via a station global variable recorded in an output memory for the programmable controller PC0. The program MS022 inputs/outputs data via a station global variable recorded in an output memory for the programmable controller PC1. These station global variables are used only in the program MS010 and the program MS022 and are not used in other programs.

At this time, the relocate management part 110 moves the program MS010 and the program MS022 to the programmable controller PC4 in the station ST2. The relocate management part 110 moves the station global variable used in the program MS010 and the program MS022 to the controller global variable in the programmable controller PC4 along with the movement of the program.

Further, the relocate management part 110 enables a variable name to be manually changed when a variable is converted, when the variable name is changed, decides whether the changed variable name overlaps with a variable name of an existing controller global variable, and converts a variable name of a program using the variable name to be converted into the changed variable name. Thus, when moving the station global variable to the controller global variable, the relocate management part 110 changes the variable name according to the conversion rule.

In the plant control system and the program relocate method according to the present embodiment, the station global variable is moved to the controller global variable as described above so that the user's manual processing can be reduced, the cost of design works can be reduced, and the plant control apparatus and the program relocate method with high quality can be provided.

A plant control system and a program relocate method according to a twelfth embodiment will be described below with reference to the drawings. The plant control system according to the present embodiment has a similar structure to the first embodiment except for the following points.

Figure 20:
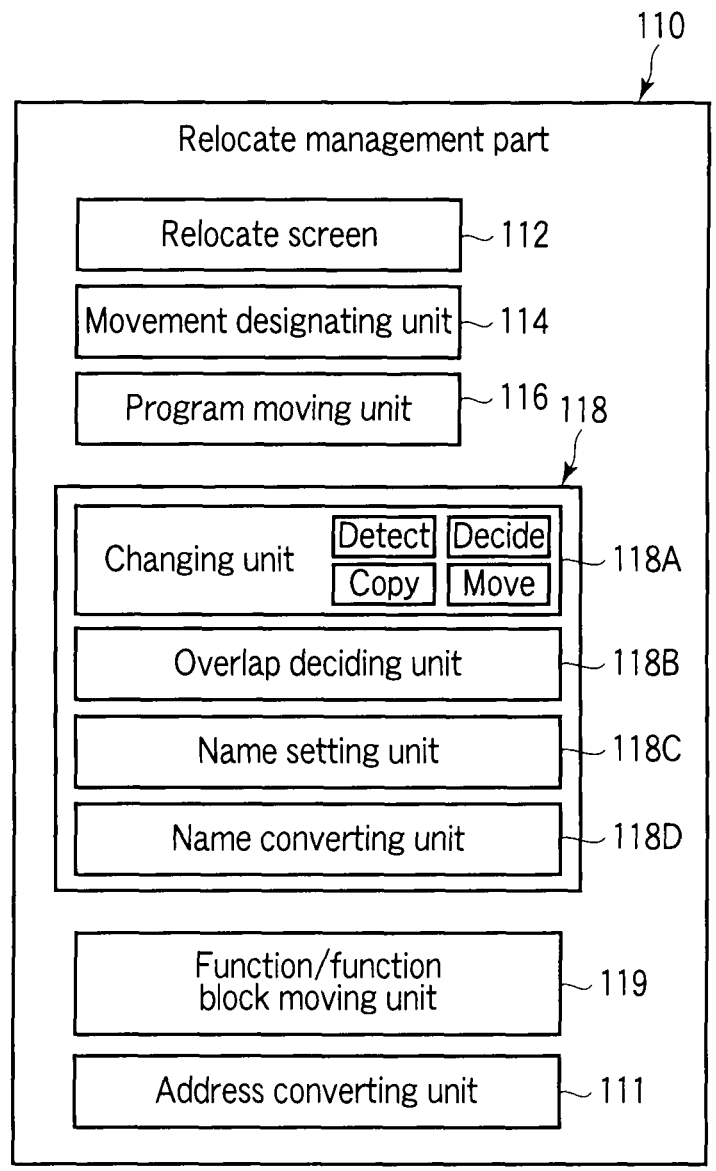
FIG. 20 is a diagram schematically showing a structure example of a relocate management part of a plant control system according to a twelfth embodiment.

FIG. 20 schematically shows a structure example of a relocate management part 110 in the plant control system according to the present embodiment.

In the present embodiment, the relocate management part 110 has an address converting module 111 configured to, when a network variable is used in one or a plurality of programs to be moved, convert an address in a data sending device 500 of a network variable through which data is output to a network.

FIG. 21 schematically shows a structure example of the plant control system before and after a program is moved. A station ST1 comprises programmable controllers PC0, PC1, PC2. The programmable controller PC0 comprises a program MS010 and a program MS012. The programmable controller PC1 comprises a program MS021.

A station ST2 comprises programmable controllers PC3, PC4, PC5. The programmable controller PC3 comprises a program MS211. The programmable controller PC4 comprises a program MS221.

The program MS010 writes data into an output destination talker block of the programmable controller PC0 and reads data from a talker block for the programmable controller PC3 within the network variable.

The program MS211 writes data into an output destination talker block of the programmable controller PC3 and reads data from a talker block for the programmable controller PC0 within the network variable.

At this time, the relocate management part 110 moves the program MS010 to the programmable controller PC4. The relocate management part 110 converts the talker block of the program MS010 into an output destination talker block of the programmable controller PC4 along with the movement of the program. Then, the relocate management part 110 updates an input destination to read the program MS211 from the talker block of the programmable controller PC3.

In the plant control system and the program relocate method according to the present embodiment, the input destination and the output source of the talker block recording the network variable therein are changed as described above so that the user's manual processing can be reduced, the cost of design works can be reduced, and the plant control apparatus and the program relocate method with high quality can be provided.

A plant control system and a program relocate method according to a thirteenth embodiment will be described below with reference to the drawings.

The plant control system according to the present embodiment does not comprise a data sending device, and moves one or a plurality of programs of a programmable controller to another programmable controller mounted on the same module without changing the logic of the program. The plant control system according to the present embodiment is connected to a plant to be controlled not via a network.

FIG. 22 shows a structure example of the plant control system according to the present embodiment. The plant control system comprises a station ST on which a plurality of programmable controllers are mountable, programmable controllers PC (PC1, PC2, PC3, ... ) capable of operating a plurality of programs and having a local variable, a controller global variable and a station global variable usable in the programs, and an engineering device 100 configured to manage memory addresses of the local variables collectively, the controller global variables and the station global variables of all the programmable controllers PC, a sending module and programs of all the programmable controllers PC.

The engineering device 100 comprises the relocate management part 110 shown in FIG. 2, first database DB1 storing program information and various items of variable information therein, second database DB2 storing a system structure therein, a database management part 120 configured to manage the first database DB1 and the second database DB2, and a hard disk HD.

The relocate management part 110 is configured to display a relocate screen 112 and to perform a program relocate processing described later.

The relocate management part 110 comprises a movement designating module 114 configured to designate an execution order of programs in a source programmable controller PC, one or a plurality of programs to be moved, a destination programmable controller PC and the source programmable controller, based on an operation signal from an input device, a program moving module 116 configured to move a program as designated by the movement designating module 114, and a variable changing module 118 configured to, when a program is moved, enable the variable used in the program to be moved or copied to be accessible from the program.

The variable changing module 118 comprises a changing module 118A configured to move or copy a variable, an overlap deciding module 118B configured to decide whether a variable name overlaps with another, a name setting module 118C configured to set a variable name, and a name converting module 118D configured to change a variable name as being set.

The first database DB1 stores therein, as the program information and the various items of variable information, information on a program source, a program object, a local variable, a controller global variable and a station global variable. The second database DB2 stores the system structure information on the plant control system therein.

The relocate management part 110 acquires the program information and the various items of variable information stored in the first database DB1 from the database management part 120. The relocate management part 110 acquires the system structure information stored in the second database DB2 from the database management part 120. When performing the program relocate processing, the relocate management part 110 supplies change information on a program or a variable to the database management part 120. The database management part 120 updates the information stored in the first database DB1 and the second database DB2 according to the change information supplied from the relocate management part 110.

The engineering device 100 is connected with a mouse 130, a keyboard 140 and a display device 150. The mouse 130 and the keyboard 140 are input devices configured to be operated by a user and to output an operation signal to the engineering device 100. The display device 150 is an output device comprising a display part (not shown) and configured to display an image on the display part based on a signal supplied from the engineering device 100.

The engineering device 100 is configured to download the program information and the variable information on the programmable controllers PC (PC0, PC1, ... ) via a data sending device 600.

The station ST comprises the programmable controllers PC0, PC1, PC2, a station global variable 700 and the data sending device 600. For example, the programmable controller PC0 records therein programs MS010, MS020, ... MS0nn, the local variables set for the respective programs MS010, MS020, ... MS0nn, and the controller global variable.

The programmable controller PC1 records therein programs MS110, MS120, ... MS1nn, the local variables set for the respective program MS110, MS120, ... MS1nn, and the controller global variable.

The programmable controller PC2 records therein programs MS210, MS220, ... MS2nn, the local variables set for the respective programs MS210, MS220, ... MS2nn, and the controller global variable.

In the present embodiment, the relocate management part 110 comprises a movement designating module 114 configured to designate an execution order of one or a plurality of programs to be moved in a source programmable controller, one or a plurality of programs to be moved, a destination programmable controller and the source programmable controller.

The program MS010 and the program MS012, for example, in the programmable controller PC0 have the local variables, and exchange data by use of a controller global variable.

At this time, when the program MS010 is moved to another programmable controller in the station ST, the programmable controller is different and thus the data cannot be exchanged via the controller global variable unlike before the movement.

Thus, in the present embodiment, the relocate management part 110 is configured to change the variable automatically not only with the movement of the program MS010 but also with the exchange of the data when the program MS010 is moved. The relocate management part 110 moves or copies the controller global variable along with the program MS010.

In the present embodiment, the movement designating module 114 displays the relocate screen 112 similar to the plant control system according to the first embodiment. FIG. 3 shows an example of a screen 112A in which a movement destination of a program is designated. The user selects a program to be moved in the movement source column after designating a destination controller, and drags and drops a mouse cursor on the row of a movement-desired task entry number in the movement destination column. The relocate management part 110 temporarily decides the movement destination, displays "*" on the task entry number, and when an "OK" button is clicked, displays a screen 112B shown in FIG. 4.

The screen 112B shown in FIG. 4 defines a conversion rule for the variable which needs to be changed along with the movement of the program. The variables which need to be changed are classified into types to be displayed at the top of the screen. The types of variable include a movement of a controller global variable to a station global variable, a movement of a controller global variable to a controller global variable of another programmable controller, and the like. When the user selects an arbitrary type, required information is displayed at the bottom of the screen.

The bottom of the screen of FIG. 4 is an example in which the controller global variable is moved to the station global variable. A variable to be moved is selected in the movement source column (multiple variables may be selected), and the mouse 130 is operated to drag and drop the cursor on a movement-desired position at the lower right of the screen in the movement destination column. At this time, a decision is made as to whether a variable name overlaps with another, and when the same variable name is present in the movement destination, the overlapping variable name is subject to reverse display to be distinguished. When the conversion is not required, the user operates the mouse 130 to click a no conversion required button so that the variable name is excluded from the conversion target.

FIG. 5 shows an example of a screen 112C in which a controller global variable is moved to a controller global variable in another programmable controller. The bottom of the screen of FIG. 4 is displayed as in FIG. 5. A variable to be moved is selected in the movement source column (multiple variables may be selected) and the mouse 130 is dragged and dropped on a movement-desired position in the movement destination column. At this time, a decision is made as to whether a variable name overlaps with another, and when the same variable name is present in the movement destination, the overlapping variable name is subject to reverse display to indicate the overlap. When the conversion is not required, the user operates the mouse 130 to click the no conversion required button so that the variable can be excluded from the conversion target.

FIG. 6 shows a screen 112D in which a conversion is defined when changing a variable name. In the present embodiment, the variable name conversion is defined as described in the first embodiment. For example, for the controller global variable, the prefix of the variable is assumed as "G_", and for the station global variable, the prefix of the variable is assumed as "S_." Thus, when the variable is moved from the controller global variable to the station global variable along with the movement of the program, the setting for the automatic conversion according to the rule is defined in the screen 112D of FIG. 6.

The prefix of the variable name is converted as described above so that when the variable is moved along with the movement of the program, the variable name conforms to the variable naming rule in the design.

As described above, in the plant control system and the program relocate method according to the present embodiment, the cost of design works can be reduced, and the plant control apparatus and the program relocate method with high quality can be provided.

A plant control system and a program relocate method according to a fourteenth embodiment will be described below with reference to the drawings. The plant control system according to the present embodiment has a similar structure to the thirteenth embodiment except for the following points.

An example of the present embodiment will be described in which, when a program is moved, if a function and a function block used in the program are present, the function and the function block can be also moved at the same time.

FIG. 7 schematically shows a structure example of a relocate management part 110 in the plant control system according to the present embodiment.

In the present embodiment, the relocate management part 110 further comprises a function/function block moving module 119 configured to move a function and a function block.

The plant control system according to the present embodiment comprises a module configured to enable a function and a function block to be simultaneously moved, when the function and the function block used in a program to be moved are present.

In FIG. 8, when a program MS010 is moved, the relocate management part 110 moves a function and a function block used in the program MS010 (CALL). At this time, the relocate management part 110 moves the function and the function block when the function and the function block are not being used in another program, and copies the function and the function block when the function and the function block are being used in another program.

In the example of FIG. 8, since a function UserFUN1 is used only in the program MS010, it is moved to a destination programmable controller together with the program MS010. Since a function block UserFBK1 is used also in a program MS012, it is copied to a destination programmable controller.

In the plant control system and the program relocate method according to the present embodiment, the function and the function block are automatically moved or copied when the program is moved as described above so that the user's manual processing can be reduced, the cost of design works can be reduced and the plant control apparatus and the program relocate method with high quality can be provided.

A plant control system and a program relocate method according to a fifteenth embodiment will be described below with reference to the drawings. The plant control system according to the present embodiment has a similar structure to the thirteenth embodiment except for the following points.

An example of the present embodiment will be described in which when a controller global variable used in one or a plurality of programs to be moved is not used to input/output data into/from a program not to be moved, the controller global variable is moved.

When a controller global variable used in one or a plurality of programs to be moved is not used to input/output data into/from a program not to be moved, a relocate management part 110 comprises a module configured to decide whether the variable name of the controller global variable overlaps with a variable name of a controller global variable already used in a destination programmable controller, a module configured to, when the variable name overlaps with another, convert the variable name of the controller global variable used in the program to be moved, and a module configured to convert the variable name used in the program into the changed variable name automatically.

The movement of the variable in the plant control system according to the present embodiment will be described with reference to FIG. 10 and FIG. 11. In FIG. 10, two programmable controllers PC0, PC1 are present in a station ST, and the programmable controller PC0 comprises a program MS010 and a program MS012. The program MS010 and the program MS012 input/output data via a controller global variable in the programmable controller PC0, respectively, but the data is not exchanged between the two programs and the same variable is not accessed.

At this time, the relocate management part 110 moves the program MS010 to the programmable controller PC1. Along with this, the controller global variable used in the program MS010 is moved from the programmable controller PC0 to the programmable controller PC1.

The relocate management part 110 decides whether the variable name of the controller global variable overlaps with a variable name of a controller global variable already used in a destination programmable controller, when the variable name overlaps with another, converts the variable name of the controller global variable used in the program to be moved, and converts the variable name used in the program into the changed variable name.

FIG. 11 shows an example in which the program MS010 and the program MS012 exchange data via the controller global variable. When the program MS010 and the program MS012 are moved, a program utilizing the controller global variable originally used in the source programmable controller is not present and thus the relocate management part 110 moves the controller global variable together.

As described above, in the plant control system and the program relocate method according to the present embodiment, the cost of design works can be reduced, and the plant control apparatus and the program relocate method with high quality can be provided.

A plant control system and a program relocate method according to a sixteenth embodiment will be described below with reference to the drawings. The plant control system according to the present embodiment has a similar structure to the thirteenth embodiment except for the following points.

An example of the present embodiment will be described in which when a source programmable controller is configured of a plurality of programs and one or a plurality of programs input/output data via a controller global variable into/from a program not to be moved, the controller global variable is converted into a station global variable.

When one or a plurality of programs to be moved input/output data via a controller global variable into/from a program not to be moved, a relocate management part 110 comprises a module configured to convert the controller global variable into a station global variable according to a conversion rule, a module configured to define the conversion rule, a module configured to enable a variable name to be manually changed when the variable is converted, a module configured to decide whether the changed variable name overlaps with a variable name of an existing station global variable when the variable name is changed, and a module configured to convert a variable name of a program using the variable name to be converted into the changed variable name automatically.

In FIG. 12, three programmable controller PC0, PC1, PC2 are present in a station ST, and a program MS010 and a program MS012 are present in the programmable controller PC0. The program MS010 and the program SM012 input/output data via a controller global variable in the programmable controller PC0, respectively, to conduct plant control.

At this time, the program MS010 is moved to the programmable controller PC1. Along with this, a controller global variable used in the two programs MS010 and MS012 is moved to a station global variable accessible from the two programmable controllers PC0, PC1.

The relocate management part 110 converts a variable according to a conversion rule, defines the variable conversion rule, enables a variable name to be manually changed when the variable is converted, when the variable name is changed, decides whether the changed variable name overlaps with a variable name of an existing station global variable, and converts a variable name of a program using the variable name to be converted into the changed variable name.

As described above, when the variable name is converted thereby to move the variable along with the movement of the program, the variable name conforms to the variable naming rule in the design.

As described above, in the plant control system and the program relocate method according to the present embodiment, the cost of design works can be reduced, and the plant control apparatus and the program relocate method with high quality can be provided.

A plant control system and a program relocate method according to a seventeenth embodiment will be described below with reference to the drawings. The plant control system according to the present embodiment has a similar structure to the thirteenth embodiment except for the following points.

An example of the present embodiment will be described in which when a station global variable used in one or a plurality of programs to be moved is not used to input/output data into/from a program not to be moved, the station global variable is converted into a controller global variable.

When the station global variable used in one or a plurality of programs to be moved is not used to input/output data into/from the program not to be moved, a relocate management part 110 comprises a module configured to convert the station global variable into a controller global variable according to a conversion rule, a module configured to define the conversion rule, a module configured to enable a variable name to be manually changed when the variable is converted, a module configured to decide whether the variable name overlaps with a variable name of a controller global variable already used in a destination programmable controller, a module configured to convert the variable name of the station global variable used in the program to be moved when the variable name overlaps with another, and a module configured to convert the variable name used in the program into the changed variable name.

In FIG. 13, three programmable controllers PC0, PC1, PC2 are present in a station ST, and the programmable controller PC0 comprises a program MS012. The programmable controller PC1 comprises a program MS010. The program MS010 and the program MS012 input/output data via a station global variable, respectively, to conduct plant control. It is assumed that the station global variable is used only in the program SM010 and the program MS012 and is not used in another program.

At this time, the relocate management part 110 moves the program SM010 to the programmable controller PC0. Along with the movement of the program, the station global variable used in the two programs MS010 and MS012 is moved to the controller global variable in the programmable controller PC0.

The relocate management part 110 converts a variable according to a conversion rule, defines the variable conversion rule, enables a variable name to be manually changed when the variable is converted, when the variable name is changed, decides whether the changed variable name overlaps with a variable name of an existing controller global variable, and converts a variable name of a program using the variable name to be converted into the changed variable name.

As described above, when the variable name is converted and thus the variable is moved along with the movement of the program, the variable name conforms to the variable naming rule in the design.

As described above, in the plant control system and the program relocate method according to the present embodiment, the cost of design works can be reduced, and the plant control apparatus and the program relocate method with high quality can be provided.

In the plant control system according to the first to seventeenth embodiments, a series of design works for the movement of the program can be advanced in a dialog form with the designer on the relocate screen 112. After the designer sets required information, a series of design works for the movement of the program is automatically performed by a guidance function enabling the designer to perform all the series of design works for the movement of the program, thereby achieving a reduction in cost due to a reduced design time when moving the program to another programmable controller, and an improvement in quality of the control system due to elimination of erroneous design.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A plant control system comprising: a station mounting a plurality of programmable controllers thereon;
    an engineering device configured to manage programs executed by the plurality of programmable controllers;
    an input device configured to be operated by a user and to supply an operation signal to the engineering device;
    a display device configured to display a video signal output from the engineering device; and
    a data sending device configured to connect the plurality of programmable controllers and the engineering device, wherein the engineering device includes database configured to store variable information on a controller global variable for allowing data to be shared among a plurality of programs in each programmable controller and a station global variable for allowing data to be shared among a plurality of programs in the station, a database management part, and a relocate management part configured to move the program, the relocate management part includes a movement designating module configured to designate a source programmable controller, one or a plurality of programs to be moved, a destination programmable controller, and an execution order of programs in the destination programmable controller, based on the operation signal from the input device, a module configured to move the program as designated in the movement designating module, and a variable changing module configured to, when the program is moved, move or copy the controller global variable and the station global variable used in the program to be accessible from the program, and when a controller global variable used in the program is previously used only locally within the destination programmable controller and is not used to input or output data from or into another program, the variable changing module further includes:
    a module configured to decide whether a variable name of the controller global variable overlaps with a variable name of a controller global variable already used in a destination programmable controller;
    a module configured to set a variable name of a controller global variable used in a program to be moved when the variable name overlaps with another; and
    a module configured to convert a variable name used in the program automatically into the set variable name.

2. The plant control system according to claim 1, further comprising:
    a data sending device which is connected to a network, which has a common memory space recording therein a network variable for enabling data to be shared among a plurality of programs in the plurality of programmable controllers, and which transmits and receives data between the network and the station,
    wherein the database further stores variable information on the network variable therein, and
    the variable changing module is configured to move or copy the network variable used in the program to be accessible from the program when the program is moved.

3. The plant control system according to claim 1, wherein the relocate management part further includes a module configured to, when the program uses a function and a function block, enable the function and the function block to be moved.

4. The plant control system according to claim 1,
    wherein, when a source programmable controller includes a plurality of programs and the program inputs data from another program or outputs data into another program via the controller global variable, the variable changing module includes:
    a module configured to define a conversion rule;
    a module configured to convert the controller global variable into the station global variable according to the conversion rule;
    a module configured to enable a variable name to be changed when the program is converted;
    a module configured to, when the variable name is changed, the changed variable name overlaps with a variable name of an existing station global variable; and
    a module configured to, when the variable name overlaps with another, convert a variable name of a program using the variable name to be converted into the changed variable name.

5. The plant control system according to claim 1, wherein, when a station global variable used in the program is not used to input data from another program and output data into another program,
    the variable changing module includes:
    a module configured to define a conversion rule;
    a module configured to convert the station global variable into a controller global variable according to the conversion rule;
    a module configured to, when the station global variable is converted, enable a variable name to be manually changed;
    a module configured to decide whether the variable name overlaps with a variable name of a controller global variable already used in a destination programmable controller,
    a module configured to, when the variable name overlaps with another, convert a variable name of the station global variable used in the program; and
    a module configured to convert the variable name into the changed variable name.

6. The plant control system according to claim 2, wherein when the source programmable controller comprises a plurality of programs and the program inputs data from another program or outputs data into another program via the controller global variable,
    the variable changing module includes:
    a module configured to convert the controller global variable into the network variable;
    a module configured to define a variable name conversion rule;
    a module configured to, when the controller global variable is converted, convert a variable name according to the variable name conversion rule;
    a module configured to enable a variable name to be manually changed when the variable is converted; a module configured to, when the variable name is changed, decide whether the changed variable name overlaps with a variable name of an existing network variable; and a module configured to, when the variable name overlaps with another, automatically convert a variable name of a program using the variable name to be converted into the changed variable name.

7. The plant control system according to claim 2, wherein, when the source programmable controller comprises a plurality of programs and one or a plurality of programs to be moved input data from another program and output data into another program via the controller global variable,
the variable changing module includes:
a module configured to convert the controller global variable into the network variable;
a module configured to define the variable name conversion rule;
a module configured to convert a variable name according to the conversion rule automatically when the controller global variable is converted;
a module configured to enable the variable name to be manually changed when the variable is converted;
a module configured to decide whether the changed variable name overlaps with a variable name of the existing network variable when the variable name is changed; and
a module configured to convert a variable name of a program using the variable name to be converted into the changed variable name when the variable name overlaps with another.

8. The plant control system according to claim 2, wherein, when the source programmable controller comprises a plurality of programs and the program inputs data from a program and outputs data into the program via the station global variable, the program is contained in another programmable controller in the same station as the programmable controller,
the variable changing module includes:
a module configured to convert the station global variable into the network variable;
a module configured to define the variable name conversion rule;
a module configured to convert a variable name according to the conversion rule when the variable is converted;
a module configured to enable the variable name to be manually changed;
a module configured to decide whether the changed variable name overlaps with a variable name of an existing network variable when a variable name is changed; and
a module configured to convert a variable name of a program using the variable name to be converted into the changed variable name automatically.

9. The plant control system according to claim 2, wherein when a network variable is used in one or a plurality of programs to be moved, the variable changing module further includes a module configured to convert an address in the data sending device of a network variable for outputting data to the network.

10. The plant control system according to claim 2, wherein the relocate management part further includes a module configured to, when the program uses a function and a function block, enable the function and the function block to be moved.

11. The plant control system according to claim 2, wherein, when a source programmable controller includes a plurality of programs and the program inputs data from another program and outputs data into another program via the controller global variable,
the variable changing module includes:
a module configured to define a conversion rule;
a module configured to convert the controller global variable into the station global variable according to the conversion rule;
a module configured to enable a variable name to be changed when the program is converted;
a module configured to, when the variable name is changed, the changed variable name overlaps with a variable name of an existing station global variable; and
a module configured to, when the variable name overlaps with another, convert a variable name of a program using the variable name to be converted into the changed variable name.

12. The plant control system according to claim 3, wherein, when a source programmable controller includes a plurality of programs and the program inputs data from another program and outputs data into another program via the controller global variable,
the variable changing module includes:
a module configured to define a conversion rule;
a module configured to convert the controller global variable into the station global variable according to the conversion rule;
a module configured to enable a variable name to be changed when the program is converted;
a module configured to, when the variable name is changed, the changed variable name overlaps with a variable name of an existing station global variable; and
a module configured to, when the variable name overlaps with another, convert a variable name of a program using the variable name to be converted into the changed variable name.

13. The plant control system according to claim 2, wherein, when a station global variable used in the program is not used to input data from another program and output data into another program,
the variable changing module includes:
a module configured to define a conversion rule;
a module configured to convert the station global variable into a controller global variable according to the conversion rule;
a module configured to, when the station global variable is converted, enable a variable name to be manually changed;
a module configured to decide whether the variable name overlaps with a variable name of a controller global variable already used in a destination programmable controller, a module configured to, when the variable name overlaps with another, convert a variable name of the station global variable used in the program; and
a module configured to convert the variable name into the changed variable name.

14. The plant control system according to claim 3, wherein, when a station global variable used in the program is not used to input data from another program and output data into another program,
the variable changing module includes:
a module configured to define a conversion rule;
a module configured to convert the station global variable into a controller global variable according to the conversion rule;
a module configured to, when the station global variable is converted, enable a variable name to be manually changed;
a module configured to decide whether the variable name overlaps with a variable name of a controller global variable already used in a destination programmable controller, a module configured to, when the variable name overlaps with another, convert a variable name of the station global variable used in the program; and a module configured to convert the variable name into the changed variable name.

15. The plant control system according to claim 4, wherein, when a station global variable used in the program is not used to input data from another program or output data into another program, the variable changing module includes:

a module configured to define a conversion rule;

a module configured to convert the station global variable into a controller global variable according to the conversion rule;

a module configured to, when the station global variable is converted, enable a variable name to be manually changed;

a module configured to decide whether the variable name overlaps with a variable name of a controller global variable already used in a destination programmable controller, a module configured to, when the variable name overlaps with another, convert a variable name of the station global variable used in the program; and a module configured to convert the variable name into the changed variable name.

16. A program relocate method for a plant control system, wherein the plant control system includes a station mounting a plurality of programmable controllers thereon;

an engineering device configured to manage programs executed by the plurality of programmable controllers;

an input device configured to be operated by a user and to supply an operation signal to the engineering device;

a display device configured to display a video signal output from the engineering device; and a data sending device configured to connect the plurality of programmable controllers and the engineering device, wherein the engineering device includes database configured to store variable information on a controller global variable for allowing data to be shared among a plurality of programs in each programmable controller and a station global variable for allowing data to be shared among a plurality of programs in the station, a database management part, and a relocate management part configured to move the program wherein the method includes:

designating a source programmable controller, one or a plurality of programs to be moved, a destination programmable controller, and an execution order of programs in the destination programmable controller; moving the program as designated; and when the program is moved, moving or copying a controller global variable and a station global variable used in the program to be accessible from the program, wherein when a controller global variable used in the program is previously used only locally within the destination programmable controller and is not used to input or output data from or into another program, the variable changing module further includes:

a module configured to decide whether a variable name of the controller global variable overlaps with a variable name of a controller global variable already used in a destination programmable controller;

a module configured to set a variable name of a controller global variable used in a program to be moved when the variable name overlaps with another; and a module configured to convert a variable name used in the program automatically into the set variable name.

17. The program relocate method according to claim 16, includes: when the program is moved, moving or copying a network variable used in the program to be accessible from the program.

* * * * *